US011335023B2

(12) United States Patent
Khamis et al.

(10) Patent No.: US 11,335,023 B2
(45) Date of Patent: May 17, 2022

(54) HUMAN POSE ESTIMATION USING NEURAL NETWORKS AND KINEMATIC STRUCTURE

(71) Applicant: Google LLC, Mountain View, CA (US)

(72) Inventors: Sameh Khamis, Mountain View, CA (US); Christian Haene, Berkeley, CA (US); Hossam Isack, Mountain View, CA (US); Cem Keskin, San Francisco, CA (US); Sofien Bouaziz, Los Gatos, CA (US); Shahram Izadi, Tiburon, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/929,811

(22) Filed: May 22, 2020

(65) Prior Publication Data

US 2021/0366146 A1 Nov. 25, 2021

(51) Int. Cl.
*G06K 9/00* (2022.01)
*G06T 7/73* (2017.01)
*G06T 3/40* (2006.01)
*G06T 11/00* (2006.01)
*G06N 3/08* (2006.01)
*G06N 3/04* (2006.01)

(52) U.S. Cl.
CPC .............. *G06T 7/73* (2017.01); *G06N 3/04* (2013.01); *G06N 3/08* (2013.01); *G06T 3/4046* (2013.01); *G06T 11/00* (2013.01); *G06T 2207/20084* (2013.01); *G06T 2207/30196* (2013.01); *G06T 2207/30244* (2013.01)

(58) Field of Classification Search
CPC ......... G06T 7/73; G06T 3/4046; G06T 11/00; G06T 2207/20084; G06T 2207/30196; G06T 2207/30244; G06N 3/04; G06N 3/08
See application file for complete search history.

(56) References Cited

U.S. PATENT DOCUMENTS

| 10,529,137 | B1 | 1/2020 | Black et al. |
| 2019/0172224 | A1* | 6/2019 | Vajda ........................ G06T 7/77 |
| 2019/0259136 | A1* | 8/2019 | Shpalensky ............... G06T 5/50 |

(Continued)

FOREIGN PATENT DOCUMENTS

WO 2017133009 A1 8/2017

OTHER PUBLICATIONS

Andriluka, et al "2d human pose estimation: New benchmark and state of the art analysis", IEEE Conference on Computer Vision and Pattern Recognition (CVPR), Jun. 2014, 8 pages.

(Continued)

*Primary Examiner* — Xin Jia
(74) *Attorney, Agent, or Firm* — Brake Hughes Bellermann LLP

(57) ABSTRACT

According to an aspect, a method for pose estimation using a convolutional neural network includes extracting features from an image, downsampling the features to a lower resolution, arranging the features into sets of features, where each set of features corresponds to a separate keypoint of a pose of a subject, updating, by at least one convolutional block, each set of features based on features of one or more neighboring keypoints using a kinematic structure, and predicting the pose of the subject using the updated sets of features.

17 Claims, 16 Drawing Sheets

(56) References Cited

U.S. PATENT DOCUMENTS

| | | | |
|---|---|---|---|
| 2020/0250874 A1* | 8/2020 | Assouline | G06N 5/022 |
| 2020/0272888 A1* | 8/2020 | Wang | G06K 9/00342 |

OTHER PUBLICATIONS

Bulat, et al, "Binarized convolutional landmark localizers for human pose estimation and face alignment with limited resources", Proceedings of the IEEE International Conference on Computer Vision, 2017, pp. 3706-3714.

Bulat, et al, "Human pose estimation via convolutional part heatmap regression", European Conference on Computer Vision, Sep. 2016, 16 pages.

Carreira, et al, "Human pose estimation with iterative error feedback", Proceedings of the IEEE conference on computer vision and pattern recognition, 2016, pp. 4733-4742.

Chen, et al, "Adversarial posenet: A structure-aware convolutional network for human pose estimation", Proceedings of the IEEE International Conference on Computer Vision, 2017, pp. 1212-1221.

Chen, et al, "Articulated pose estimation by a graphical model with image dependent pairwise relations", Advances in neural information processing systems, 2014, 9 pages.

Chu, et al, "Multi-context attention for human pose estimation", Proceedings of the IEEE Conference on Computer Vision and Pattern Recognition, 2017, pp. 1831-1840.

Courbariaux, et al, "Binarized neural networks: Training deep neural networks with weights and activations constrained to +1 or-1", arXiv: 1602.02830, Mar. 2016, 11 pages.

de Bem, et al, "Deep fully-connected part-based models for human pose estimation", Asian Conference on Machine Learning, 2018, pp. 327-342.

Felzenszwal, et al, "Pictorial structures for object recognition", International journal of computer vision, 61(1), 2005, 39 pages.

Isafutdinov, et al, "Deepercut: A deeper, stronger, and faster multi-person pose estimation model", European Conference on Computer Vision, 2016, 22 pages.

Johnson, et al, "Clustered pose and nonlinear appearance models for human pose estimation", British Machine Vision Association, 2010, 11 pages.

Johnson, et al, "Learning effective human pose estimation from inaccurate annotation", Proceedings of the IEEE Conference on Computer Vision and Pattern Recognition, 2011, pp. 1465-1472.

Mensch, et al, "Differentiable dynamic programming for structured prediction and attention", arXiv preprint arXiv:1802.03676, Feb. 20, 2018, 28 pages.

Newell, et al, "Stacked hourglass networks for human pose estimation", European conference on computer vision, Jul. 26, 2016, pp. 483-499.

Niculae, et al, "A regularized framework for sparse and structured neural attention", Advances in Neural Information Processing Systems, 2017, pp. 3338-3348.

Nie, et al, "Human pose estimation with parsing induced learner", Proceedings of the IEEE Conference on Computer Vision and Pattern Recognition, 2018, pp. 2100-2108.

Peng, et al, "Jointly optimize data augmentation and network training: Adversarial data augmentation in human pose estimation", Proceedings of the IEEE Conference on Computer Vision and Pattern Recognition, 2018, pp. 2226-2234.

Rafi, et al, "An efficient convolutional network for human pose estimation", British Machine Vision Conference, vol. 1, 2016, 11 pages.

Rastegari, et al, "Xnor-net: Imagenet classification using binary convolutional neural networks", European Conference on Computer Vision, Aug. 2, 2016, 17 pages.

Sekii, "Pose proposal networks", Proceedings of the European Conference on Computer Vision, 2018, pp. 342-357.

Tompson, et al, "Joint training of a convolutional network and a graphical model for human pose estimation", Advances in neural information processing systems, 2014, 9 pages.

Wei, et al, "Convolutional pose machines", Proceedings of the IEEE Conference on Computer Vision and Pattern Recognition, 2016, pp. 4724-4732.

Yang, et al, "Articulated human detection with flexible mixtures of parts", IEEE transactions on pattern analysis and machine intelligence, vol. 35, No. 12, Dec. 2013, pp. 2878-2890.

Yang, et al, "End-to-end learning of deformable mixture of parts and deep convolutional neural networks for human pose estimation", Proceedings of the IEEE Conference on Computer Vision and Pattern Recognition, 2016, pp. 3073-3082.

Yang, et al, "Learning feature pyramids for human pose estimation", Proceedings of the IEEE International Conference on Computer Vision, 2017, pp. 1281-1290.

Yu, et al, "Deep deformation network for object landmark localization", European Conference on Computer Vision, 2016, 17 pages.

Zhang, et al, "Fast human pose estimation", Proceedings of the IEEE Conference on Computer Vision and Pattern Recognition, 2019, pp. 3517-3526.

* cited by examiner

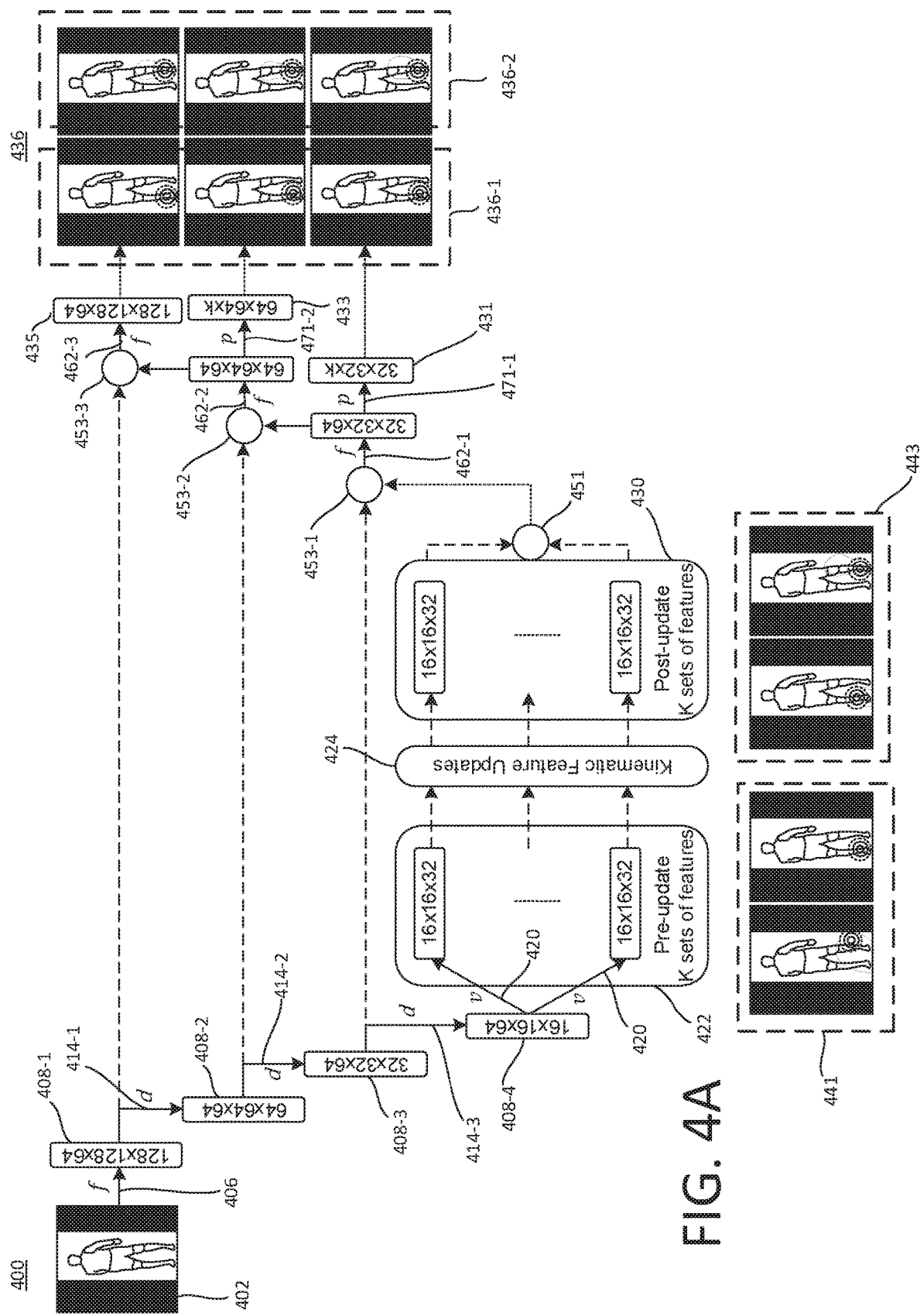

HUMAN POSE ESTIMATION USING NEURAL NETWORKS AND KINEMATIC STRUCTURE

TECHNICAL FIELD

This description generally relates to human pose estimation from an image using one or more convolutional neural networks.

BACKGROUND

Human pose estimation is a fundamental problem in computer vision and an active field of research. For example, estimating and tracking an arbitrary pose from an image or a video sequence may be a challenging problem because it often involves capturing subtle nuances in human poses and may be complicated by background distractions, changes in surrounding lighting conditions and other disturbances. Some conventional methods have used large convolutional neural networks (CNNs) to estimate human poses. However, these CNNs are typically very large (e.g., 30 to 60 million trainable parameters), thereby prohibiting their usage in systems where compute and power are constrained, e.g. mobile phones or other computing devices. Also, decreasing the size of these models may result in a relatively large loss of accuracy.

SUMMARY

According to an aspect, a method for pose estimation using a convolutional neural network includes extracting features from an image, downsampling the features to a lower resolution, arranging the features into sets of features, where each set of features corresponds to a separate keypoint of a pose of a subject, updating, by at least one convolutional block, each set of features based on features of one or more neighboring keypoints using a kinematic structure, and predicting the pose of the subject using the updated sets of features.

According to some aspects, the method may include one or more of the following features (or any combination thereof). The kinematic structure includes a plurality of nodes corresponding to the keypoints, and a plurality of edges representing connections between the nodes, where the plurality of edges are annotated with machine-learned connectivity information. The sets of features are updated one set at a time, where the kinematic structure includes ordering information that specifies a predefined order to update the sets of features. The downsampling includes downsampling the features multiple times using a series of convolutional blocks. The sets of features includes a first set of features corresponding to a first keypoint, a second set of features corresponding to a second keypoint, and a third set of features corresponding to a third keypoint, wherein the updating includes updating, by a series of convolutional blocks, the first set of features based on the second and third sets of features in response to the second and third sets being identified as neighboring keypoints by the kinematic structure. The method may include upsampling, by at least one convolutional block, to increase the resolution of the updated sets of features, where the pose of the subject is predicted using the upsampled, updated sets of features. The upsampling may include upsampling, by one or more first convolutional blocks, to increase the resolution of the updated sets of features to obtain first upsampled features, upsampling, by one or more second convolutional blocks, to increase the resolution of the first upsampled features to obtain second upsampled features, and upsampling, by one or more third convolutional blocks, to increase the resolution of the second upsampled features to obtain third upsampled features, where one or more first heatmaps are generated based on the first upsampled features, one or more second heatmaps are generated based on the second upsampled features, and one or more third heatmaps are generated based on the third upsampled features. The predicting the pose includes generating a separate heatmap for each keypoint of the pose.

According to an aspect, a non-transitory computer-readable medium storing executable instructions that when executed by at least one processor are configured to cause the at least one processor to extract, by at least one first convolutional block, features from an image, where the extracted image features have a first resolution; downsample, by at least one second convolutional block, the features to have a second resolution lower than the first resolution, arrange, by at least one third convolutional block, the features with the second resolution into sets of features, where each set of features corresponds to a different keypoint of a pose, update, by at least one fourth convolutional block, each set of features based on features of one or more neighboring keypoints using a kinematic structure, upsample, by at least one fifth convolutional block, the updated sets of features to have a third resolution higher than the second resolution, and predict, by at least one sixth convolutional block, one or more heatmaps using the updated sets of features with the third resolution.

According to some aspects, the non-transitory computer-readable medium may include one or more of the following features (or any combination thereof). The kinematic structure includes a plurality of nodes corresponding to the keypoints, and a plurality of edges representing connections between the nodes, where the plurality of edges are annotated with machine-learned connectivity information. The sets of features are updated one set at a time, where the kinematic structure includes ordering information that specifies a predefined order to update the sets of features, and the predefined order indicates to update sets of features relating to shoulders and hips before updating sets of features relating to ankles and wrists. The features are downsampled multiple times using a series of convolutional blocks, where the second resolution is equal to or less than 16×16 pixels. The sets of features includes a first set of features corresponding to a right shoulder, a second set of features corresponding to a left shoulder, and a third set of features corresponding to a right elbow, where the first set of features are updated by a series of convolutional blocks based on the second and third sets of features in response to the second and third sets being identified as neighboring keypoints by the kinematic structure. The updated sets of features are upsampled multiple times such that each upsample operation generates a separate set of upsampled features each having a different resolution, where heatmaps with different resolutions are generated based on the separate sets of upsampled features.

According to an aspect, a computing device for predicting human poses using a convolutional neural network includes at least one processor, and a non-transitory computer-readable medium storing executable instructions that when executed by at least one processor are configured to execute a pose estimation system. The pose estimation system includes a feature extractor configured to use at least one first convolutional block to extract features from an image, a downsampler configured to use at least one second convolutional block to downsample the features to a lower resolution, a feature arranger configured to use at least one third convolutional block to arrange the features into sets of features, where each set of features corresponds to a separate keypoint of a pose of a subject, a kinematic feature updater configured to use at least one fourth convolutional block to update each set of features based on features of one or more neighboring keypoints using a kinematic structure, and a heatmap predictor configured to use at least one convolutional block to generate one or more heatmaps such that a heatmap predicts a location of at least one keypoint in the image.

According to some aspects, the computing device may include one or more of the following features (or any combination thereof). The computing device may be a server computing device. The computing device may be a mobile computing device. The mobile computing device includes a client augment reality (AR) application configured to execute on an operating system of the mobile computing device, where the client AR application includes the pose estimation system. The kinematic structure includes a plurality of nodes corresponding to the keypoints, and a plurality of edges representing connections between the nodes, where the plurality of edges are annotated with machine-learned connectivity information. The sets of features are updated one set at a time, where the kinematic structure includes ordering information that specifies a predefined order to update the sets of features.

The details of one or more implementations are set forth in the accompanying drawings and the description below. Other features will be apparent from the description and drawings, and from the claims.

BRIEF DESCRIPTION OF THE DRAWINGS

FIG. 4A illustrates a pose estimation system according to another aspect.

DETAILED DESCRIPTION

Figure 1A:
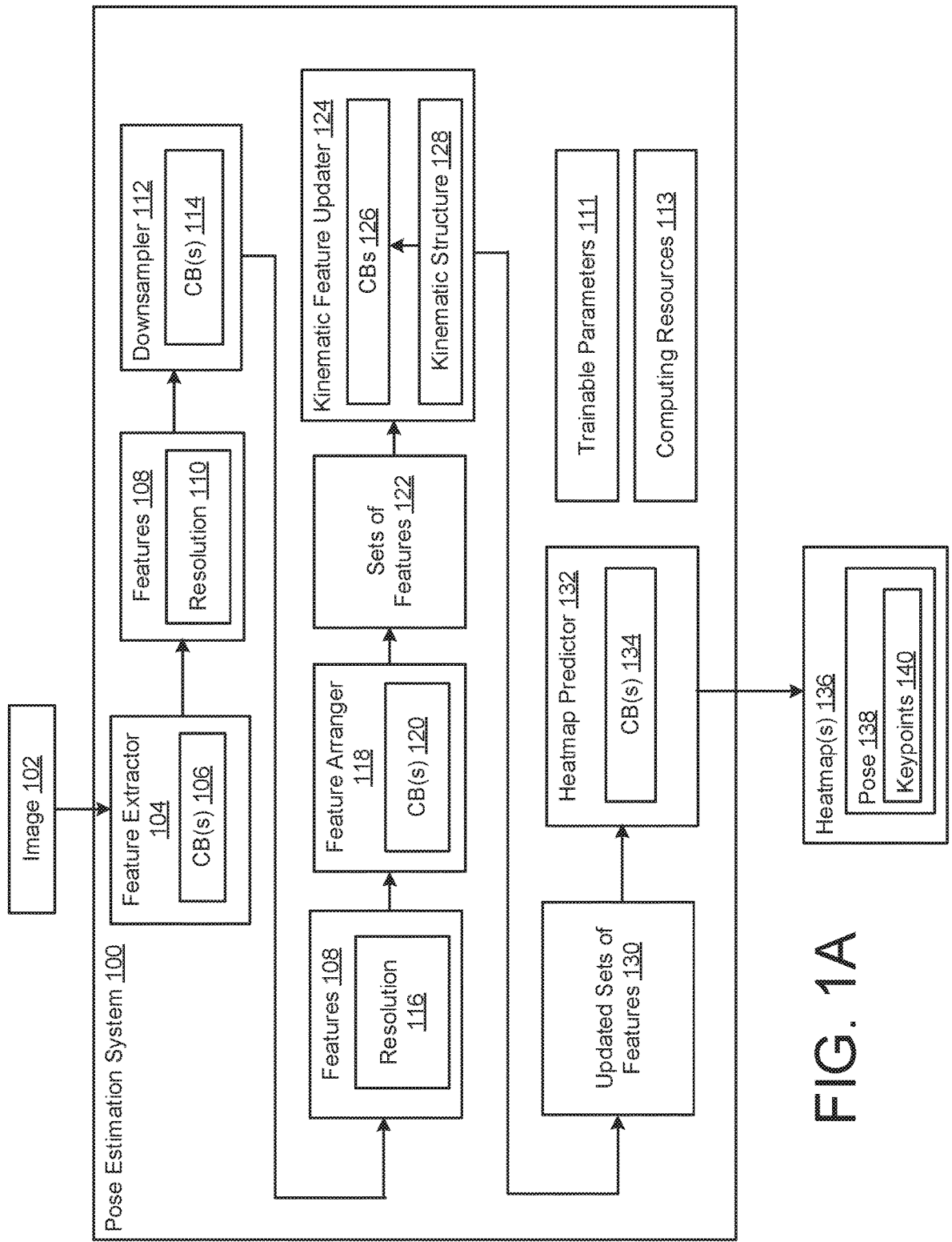
FIG. 1A illustrates a pose estimation system according to an aspect.

This disclosure relates to a pose estimation system that includes one or more CNNs that use a part-based structural model (e.g., a kinematic structure) to achieve accurate (e.g., highly accurate) human body pose estimation while keeping the model's complexity relatively small. The kinematic structure defines machine-learned connectivity information, which includes structural and geometric information (also referred to as structural and geometric priors) between keypoints or body parts. At a relatively coarse resolution, the pose estimation system leverages the kinematic structure to propagate convolutional feature updates between the keypoints or body parts. In contrast to some conventional approaches, the pose estimation system adopts end-to-end training to learn the structural and geometric priors through feature updates from data. In some examples, the feature representation at the coarsest resolution is then propagated up a network hierarchy to refine the predicted pose in a coarse-to-fine fashion.

For example, using a series of convolutional blocks, the pose estimation system is configured to extract features from an image, downsample the resolution of the features (e.g., multiple times), and arrange the downsampled features into independent sets of features, where each set of features corresponds to a separate keypoint of a pose. Then, the pose estimation system is configured to use a series of convolutional blocks to update each set of features based on features of one or more neighboring keypoints using the kinematic structure. As indicated above, the kinematic structure defines machine-learned connection information that provides information on how the different keypoints (or body parts) are correlated. In some examples, the updated sets of features are upsampled (e.g., upsampled multiple times) using a series of convolutional blocks to provide the updated sets of features at different resolution levels, where the updated sets of features at the different resolution levels are used to predict the pose in a coarse-to-fine fashion.

The pose estimation system discussed herein is configured to achieve competitive results at a fraction of the number of trainable parameters and computational cost of various conventional models. Some conventional approaches such as early computer vision techniques for human pose estimation use part-based graphical models. While the kinematic structure of the human body is well defined, the distribution of joint distances and angles is complex and hard to model explicitly when projected on two dimensions (2D). Therefore, these earlier approaches often simplified this distribution for example to Gaussian potentials. In contrast, the pose estimation system discussed herein encodes the kinematic structure in a network architecture and permits the network to learn the structural and geometric priors from data.

Some more recent deep learning approaches have also made use of a kinematic prior approximating a maximum a posteriori (MAP) solver within a neural network, typically through implementing the max-sum algorithm within the network. Running a MAP solver may be computationally expensive and may require an explicit description of the distribution. However, the pose estimation system discussed herein may avoid these issues by employing a kinematically structured network, which allows the system to incorporate the geometric and structural priors without incurring the computational penalty. The pose estimation system discussed herein encodes this structure at a coarse resolution, where a small receptive field is large enough to capture and spatially correlate neighboring pose keypoints. Moreover, employing the kinematic feature update module at a coarse resolution keeps the network lightweight.

FIGS. 1A through 1F illustrate a pose estimation system 100 according to an aspect. The pose estimation system 100 incorporates a kinematic structure 128 into a convolutional neural network (CNN) to predict a pose 138 of a subject in an image 102 while keeping the complexity of the CNN model relatively small. The kinematic structure 128 encodes structural and geometric priors about the structure of the human body, which have been learned by the pose estimation system 100 during CNN model training. The pose estimation system 100 receives an image 102 (e.g., a single image) and predicts a pose 138 of a human depicted in the image 102, where the kinematic structure 128 is leveraged (at a relatively coarse level) to propagate convolutional feature updates between keypoints or body parts. The pose 138 is identified by a set of keypoints 140 that are estimated by the pose estimation system 100. The keypoints 140 relate to different body parts (or joints) of the human body such as ankles, hips, head, shoulders, elbows, etc. The pose estimation system 100 may be applicable to a wide variety of applications such as action recognition, animation, gaming, virtual reality, video games, clothing industry, fitness, health, and/or special effects, etc.

According to the techniques described herein, the pose estimation system 100 extracts features 108 using one or more convolutional blocks 106 and downsamples the extracted features 108 using one or more convolutional blocks 114. In some examples, the extracted and downsampled features 108 have a resolution 116 that is relatively low. In some examples, the resolution 116 is 16×16 pixels. However, the resolution 116 may encompass other values such as 32×32 pixels or 8×8 pixels. Also, at this point, the features 108 are generally related to the keypoints 140, but the features 108 have not been precisely determined as relating to an ankle, hip, head, etc. Then, the pose estimation system 100 uses one or more convolutional blocks 120 to arrange the features 108 into sets of features 122, where each set of features 122 corresponds to a separate keypoint 140.

With the sets of features 122 at a relatively coarse resolution (e.g., 32×32, 16×16, 8×8), the pose estimation system 100 uses one or more convolutional blocks 126 to apply a kinematic feature update (or referred to as a convolutional feature update) to each set of features 122 based on a kinematic structure 128. Using the kinematic structure 128 at a relatively coarse resolution may reduce the amount of computing resources 113 required for human pose estimation. The output of the convolutional blocks 126 are sets of updated features 130, which have been updated using the kinematic structure 128. The sets of features 122 (before the kinematic feature updates) may be referred to as pre-updated sets of features. The updated set of features 130 (after the kinematic feature updates) may be referred to as post-updated sets of features. The pose estimation system 100 applies a kinematic feature update (or convolutional feature update) to each set of features 122 that leverages the kinematic structure 128 to predict which set of features 122 corresponds to which keypoint 140, which results in the post-updated sets of features (e.g., the updated sets of features 130). In other words, the pose estimation system 100 incorporates a part-based approach (e.g., using the kinematic structure 128) into a CNN-based approach in order to more accurately predict the keypoints 140 of the pose 138 in a manner that reduces the trainable parameters 111 and the computing resources 113.

The kinematic structure 128 may be a model that defines the kinematic connectivity between keypoints 140. The kinematic connectivity may include structural and geometric information (also referred to as structural and geometric priors) between the keypoints 140. In some examples, the kinematic structure 128 models the distribution of keypoint distances and angles. In some examples, the kinematic structure 128 is referred to as a body part model. In some examples, the kinematic structure 128 is referred to as a part-based graphical model. The kinematic structure 128 encodes structural and geometric information about the structure of the human body, which have been learned by the pose estimation system 100 during a training phase.

In addition, the kinematic structure 128 may define an ordering of which set of features 122 (or keypoints 140) to update next. For example, the ordering of the kinematic structure 128 may indicate to update the sets of features 122 relating to keypoints 140 that are more likely to be predicted with high fidelity, e.g., hips or head, and may end with typically poorly predicted ones, e.g., wrists or ankles. The kinematic structure 128 is used to update each set of features 122 based on features of one or more neighboring keypoints 140. For example, a set of features 122 may relate to a keypoint 140 of a right hip. The kinematic structure 128 may indicate that the right hip has a relationship with the right knee, a relationship with the right wrist, a relationship with the left hip, etc. The details of those relationships (e.g., the structural and geometric priors) are learned by the convolutional blocks 126 during the training phase and applied to the set of features 122 to more accurately predict which keypoint 140 corresponds to a particular set of features 122.

The pose estimation system 100 predicts the pose 138 using the updated sets of features 130. For example, the pose estimation system 100 uses one or more convolutional blocks 134 to predict the location of the keypoints 140 based on the updated sets of features 130. In some examples, the pose 138 is a 2D pose. In some examples, the pose 138 includes (x,y) coordinates for each keypoint 140 in the image 102. In some examples, the pose estimation system 100 generates one or more heatmaps 136 based on the updated sets of features 130, where a heatmap 136 predicts the probability of a keypoint 140 occurring at each pixel in the image 102. The output of the convolutional blocks 134 may be one or more heatmaps 136.

According to the techniques described herein, the pose estimation system 100 may reduce the number of trainable parameters 111 and the amount of computing resources 113 required to implement the pose estimation system 100, as compared with some conventional approaches, while at the same time providing a relatively high degree of accuracy for correctly predicting poses 138 in an image 102. In some examples, the trainable parameters 111 and the computing the pose estimation system 100 can be incorporated into a computing device where compute and power are constrained. In some examples, the pose estimation system 100 is incorporated into a mobile computing device such as a mobile phone, laptop, tablet, etc. However, the pose estimation system 100 may be incorporated into any type of computing device including one or more computers or one or more server computers. In some examples, the number of trainable parameters 111 is less than ten million. In some examples, the number of trainable parameters 111 is less than five million. In some examples, the number of trainable parameters 111 is around four million or less than four million. In contrast, the number of trainable parameters for some conventional approaches can be greater than thirty million or greater than sixty million, which may prevent the incorporation of these conventional models into relatively small computing devices. In some examples, the computing resources 113 include floating point operations per second (FLOPS). In some examples, the number of operation is less than fifteen Giga FLOPS. In some examples, the number of FLOPS is less than fourteen Giga FLOPS.

In further detail, the pose estimation system 100 includes a feature extractor 104 that extracts features 108, a downsampler 112 that reduces the resolution of the features 108, a feature arranger 118 that arranges the features 108 into independent sets of features 108, a kinematic feature updater 124 that updates the sets of features 108 using the kinematic structure 128, and a heatmap predictor 132 that generates one or more heatmaps 136 that predict the keypoints 140 of the pose 138. The feature extractor 104, the downsampler 112, the feature arranger 118, the kinematic feature updater 124, and the heatmap predictor 132 use a plurality of convolutional blocks, which form part of a convolutional neural network or multiple convolutional neural networks.

The feature extractor 104 may receive an image 102 and extract the features 108 from the image 102. In some examples, the image 102 is a single image, and the pose estimation system 100 is configured to predict the pose 138 using only the single image as an image source. In some examples, the image 102 includes a set of images or image data from a video sequence.

Figure 1B:
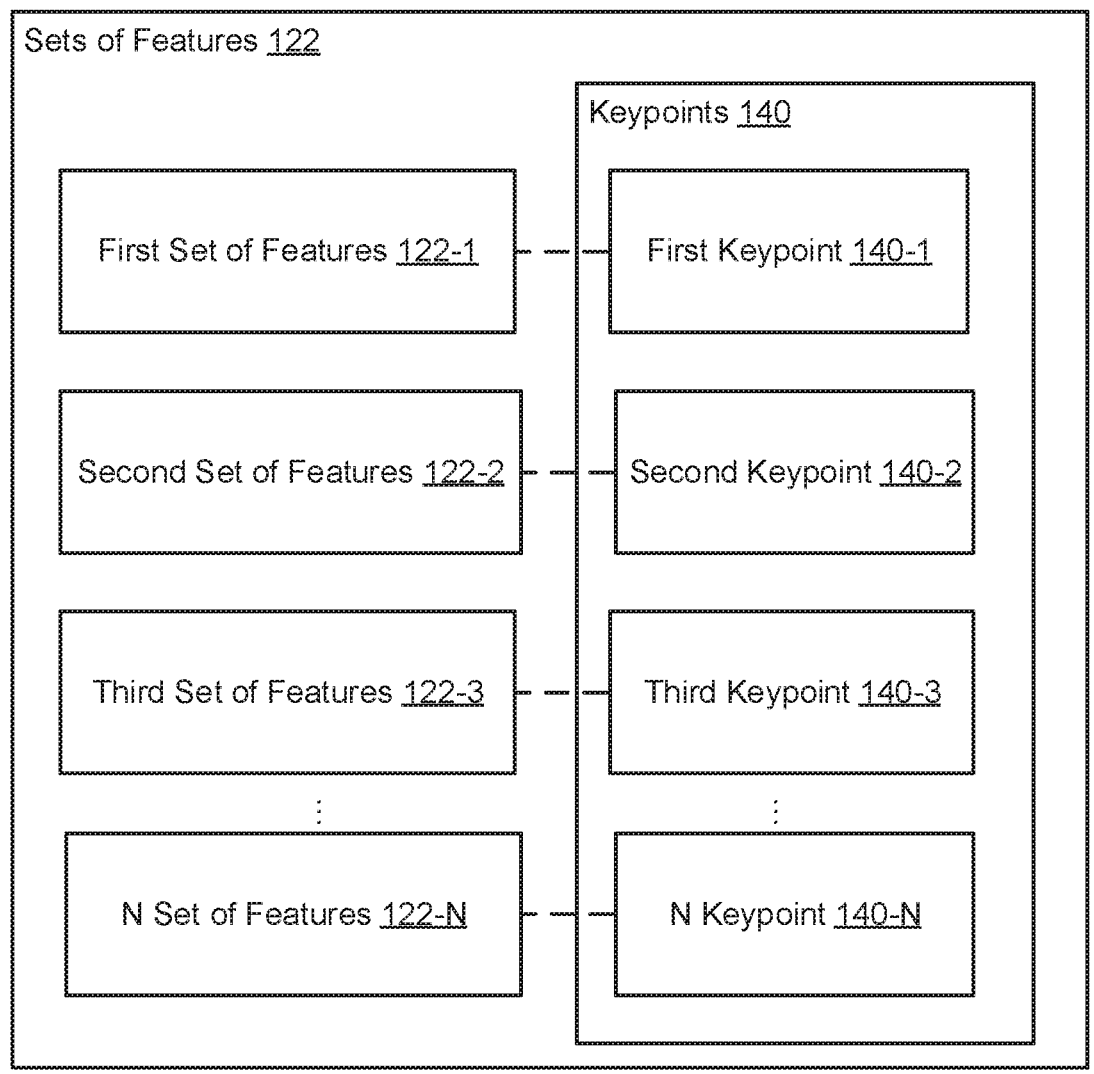
FIG. 1B illustrates independent sets of features to be updated using a kinematic model according to an aspect.
Figure 1C:
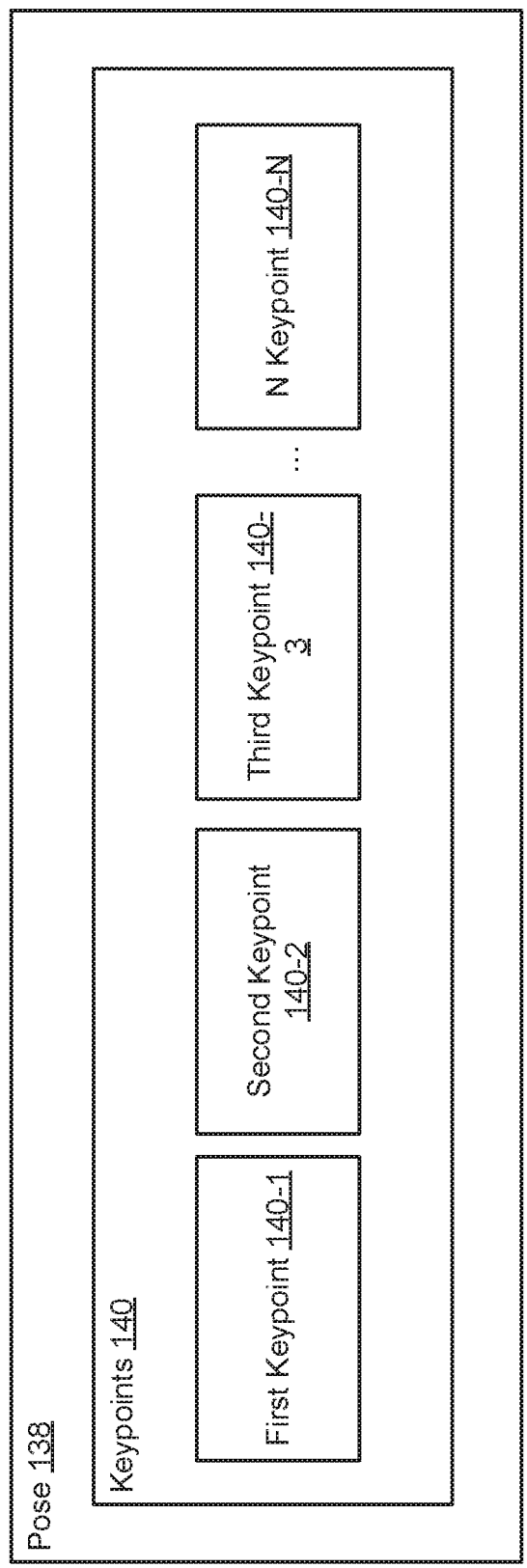
FIG. 1C illustrates a pose defined by a plurality of keypoints according to an aspect.

As shown in FIG. 1C, the pose 138 may be defined by a set of keypoints 140. For example, the keypoints 140 may include a first keypoint 1401-1, a second keypoint 140-2, and a third keypoint 140-3 through N keypoint 140-N. The integer N may be any value greater than three. The pose estimation system 100 estimates the pose 138 of a subject (e.g., human) in the image 102 by estimating the location of the keypoints 140. The keypoints 140 may include body parts that form the pose 138. In some examples, the keypoints 140 include head, neck, right shoulder, left shoulder, right elbow, left elbow, right wrist, left wrist, right hip, left hip, right knee, left knee, right angle, and/or left ankle. In some examples, the keypoints 140 include nose, left eye, and/or right eye. Generally, the keypoints 140 may refer to specific body parts or joints that form the pose 138. In some examples, the heatmap predictor 132 generates one or more heatmaps 136, where a heatmap 136 predicts the probability of a keypoint 140 occurring at each pixel in the image 102. In some examples, the heatmap 136 generated by the heatmap predictor 132 includes all the keypoints 140 of the pose 138. For example, the heatmap 136 identifies the locations of the first keypoint 140-1 through N keypoint 140-N. In some examples, the heatmap predictor 132 generates a separate heatmap 136 for each keypoint 140 of a pose 138. For example, a first heatmap depicts the location of a first keypoint 140-1, a second heatmap depicts the location of a second keypoint 140-2, a third heatmap depicts the location of a third keypoint 140-3, and so forth.

The feature extractor 104 includes a series of convolutional blocks 106. In some examples, the convolutional blocks 106 include a series of convolution blocks followed by ReLU activation and batch normalization. In some examples, the convolution blocks 106 are a series of r convolutional blocks denoted by $(\mathcal{K}, \mathcal{S}, \mathcal{F})^r$, where $\mathcal{K}$, $\mathcal{S}$, and $\mathcal{F}$ are kernel size, stride, and the number of output filters. In some examples, the convolutional blocks 106 includes $(3, 1, 64)^4$. However, the convolutional blocks 106 may include any number of convolutional blocks such as two, three, or any value greater than four.

A convolution block may represent a layer that can be used to detect features 108 in the image 102, either working directly on the image 102 or on the output of a previous convolution block. Each layer may include a configurable number of filters, where each filter is a matrix (e.g., height, weight, depth) of trainable weights. A convolutional operation is performed between the image 102 and each filter, producing as output a new image with height and weight determined by the input image, stride and padding (e.g., the output height and weight are inversely proportional to the stride as many color channels as the number of filters). Every value in the tensor is then fed through an activation function to introduce a nonlinearity. Each pixel in the image 102 represents how strongly the corresponding feature is present in the (height×weight) area centered on that pixel.

In some examples, the features 108 are portions (e.g., patches) of the image 102 that correspond to points of interest, e.g., the keypoints 140 of the pose 138. In some examples, the features 108 includes appearance encoding. For example, appearance encoding is commonly referred to as features in machine learning. In some examples, the features 108 may be referred to as feature maps or a feature matrix with dimensions of height, width and depth, where depth corresponds to color channels (RGB). The values for the height and the width may define a resolution 110 of the features 108. In some examples, the resolution 110 of the features 108 is the resolution of the original image (e.g., the image 102). In some examples, the resolution 110 of the features 108 is 128×128 pixels, and the number of color channels is 64 (e.g., the feature matrix having dimensions 128×128×64).

The downsampler 112 may receive the features 108 and reduce the resolution 110 to a lower resolution, e.g., resolution 116. In some examples, the downsampler 112 may create a multi-resolution appearance encoding. The downsampler 112 includes one or more convolutional blocks 114. In some examples, the downsampler 112 includes a single convolution block. In some examples, the downsampler 112 includes multiple convolutional blocks (e.g., in the case of multiple downsampling). In some examples, the convolutional blocks 114 include convolutional blocks without batch normalization. In some examples, each convolutional block 114 is denoted by $(\mathcal{K}, \mathcal{S}, \mathcal{F})$, where $\mathcal{K}$, $\mathcal{S}$, and $\mathcal{F}$ are kernel size, stride, and the number of output filters. In some examples, a convolutional block 114 includes a convolutional block with dimensions of (5, 2, 64). A convolutional block 114 receives the features 108 with the resolution 110 and outputs features 108 with resolution 116. The resolution 116 may be any value that is less than the resolution 110. In some examples, the resolution 116 is 64×64 pixels. In some examples, the resolution 116 is 32×32 pixels. In some examples, the resolution 116 is 16×16 pixels. In some examples, the resolution 116 is 8×8 pixels. In some examples, the downsampler 112 includes multiple convolutional blocks 114 that are configured to sequentially downsample the features 108 in order to provide a relatively coarse resolution.

Figure 1D:
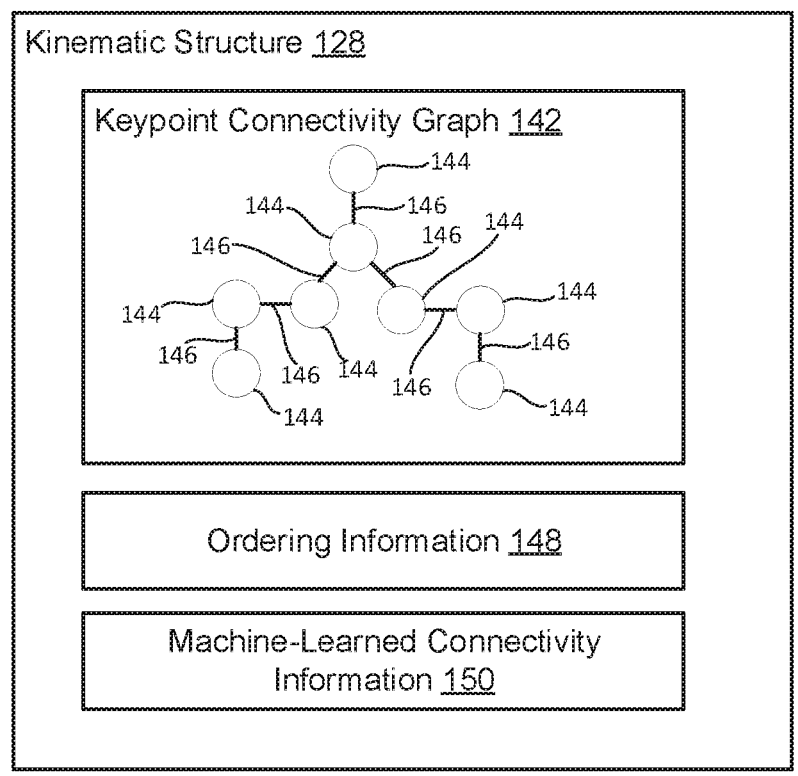
FIG. 1D illustrates a kinematic structure according to an aspect.
Figure 1E:
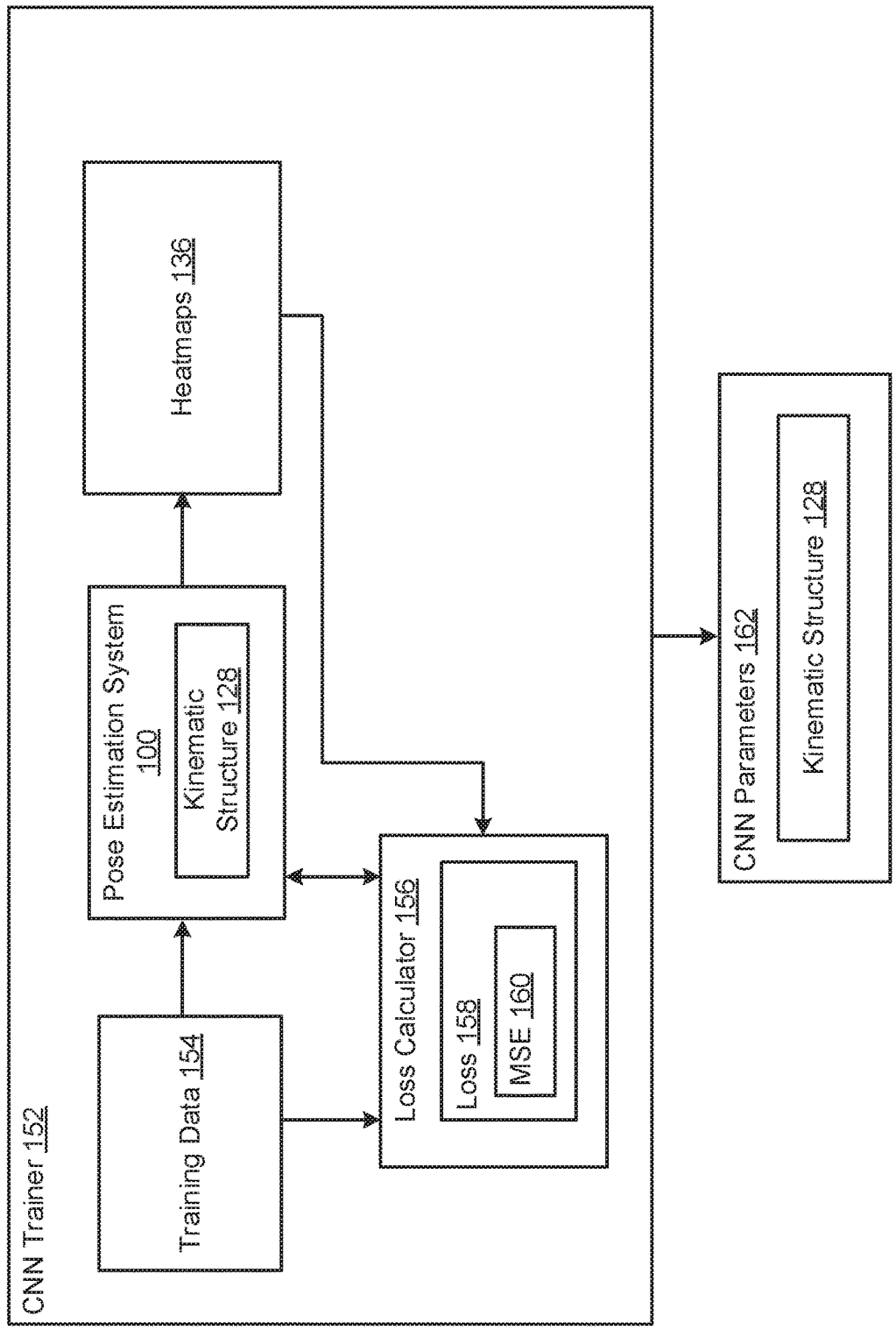
FIG. 1E illustrates a convolutional neural network trainer for training the pose estimation system according to an aspect.
Figure 1F:
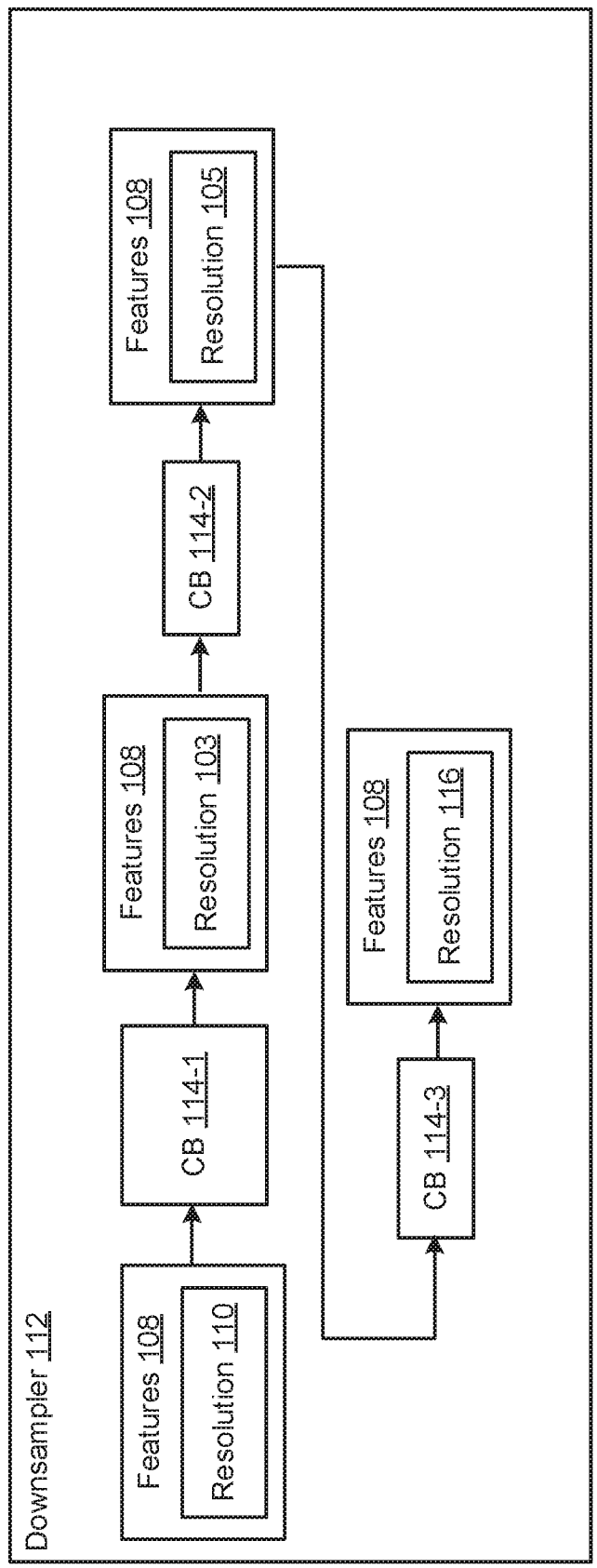
FIG. 1F illustrates an example of a downsampler according to an aspect.

Referring to FIG. 1F, the downsampler 112 may include a first convolutional block 114-1, a second convolutional block 114-2, and a third convolutional block 114-3. Although FIG. 1F depicts three convolutional blocks 114, the downsampler 112 may include any number of convolutional blocks 114 including one, two, or any number greater than three. In some examples, each of the first convolutional block 114-1, the second convolutional block 114-2, and the third convolutional block 114-3 includes a convolutional block with dimensions of (5, 2, 64). In some examples, one or more convolutional blocks 114 include dimensions that are different from one or more other convolutional blocks 114. The first convolutional block 114-1 may receive the features 108 with the resolution 110 and output features 108 with a resolution 103. The resolution 103 may be any value lower than the resolution 110. The second convolutional block 114-2 may receive the features 108 with the resolution 103 and output features 108 with a resolution 105. The resolution 105 may be any value lower than the resolution 103. The third convolutional block 144-3 may receive the features 108 with the resolution 105 and output features 108 with the resolution 116. The resolution 116 may be any value lower than the resolution 105. In some examples, the resolution 103 is 64×64, the resolution 105 is 32×32, and the resolution 116 is 16×16.

With the features 108 at the relatively coarse resolution (e.g., the resolution 116), the feature arranger 118 uses one or more convolutional blocks 120 to arrange the features 108 with the resolution 116 into sets of features 122, where each set of features 122 corresponds to a different keypoint 140. In other words, the feature arranger 118 decouples the features 108 into independent sets of features 122, where each set of features 122 is image data separate from each other. Each set of features 122 may have a resolution that is the same as the resolution 116. In some examples, each set of features 122 has a resolution of 16×16 pixels. In some examples, each set of features 122 has a number of color channels equal to thirty-two. In some examples, when localizing N keypoints 140, there are N different appearance encodings, one appearance encoding per keypoint 140. For instance, as indicated above, the term features may also refer to appearance encoding.

As shown in FIG. 1B, the set of features 122 includes a first set of features 122-1, a second set of features 122-2, and a third set of features 122-3 through N set of features 122-1. The first set of features 122-1 corresponds to a first keypoint 140-1, the second set of features 122-2 corresponds to a second keypoint 140-2, a third set of features 122-3 corresponds to a third keypoint 140-3, and an N set of features 122-N corresponds to the N keypoint 140-N. In some examples, the convolutional block 120 includes a single convolutional block with a dimension of (5, 2, 64). In some examples, the feature arranger 118 includes a separate convolutional block 120 for each keypoint 140. For example, each convolutional block 120 (e.g., (5, 2, 64)) outputs a separate set of features 122.

With the sets of features 122 at a relatively coarse level, the kinematic feature updater 124 uses a series of convolutional blocks 126 to update the sets of features 122 to generate updated sets of features 130 based on the kinematic structure 128. The kinematic feature updater 124 updates the sets of features 122 in a way that enables the pose estimation system 100 to learn the geometric and structure priors between keypoints 140 and how to correlate the keypoints 140. The kinematic feature updater 124 may update the sets of features 122 one at a time according to a predefined ordering, as further discussed below. In some examples, the convolutional blocks 126 include (1, 1, 32) and (3, 1, 32)$^4$ convolutional blocks.

The kinematic structure 128 is a model that defines the kinematic connectivity between keypoints 140. Referring to FIG. 1D, the kinematic structure 128 includes a keypoint connectivity graph 142. In some examples, the keypoint connectivity graph 142 is an undirected graph. The keypoint connectivity graph 142 includes nodes 144 and edges 146. Each node 144 corresponds to a separate keypoint 140. Each edge 146 may represent machine-learned connectivity information 150 between two keypoints 140.

The machine-learned connectivity information 150 may include structural and geometric information (also referred to as structural and geometric priors) between the keypoints 140. For instance, the left elbow and the left wrist are correlated, where when the left wrist moves, there is a geometric kinematic interaction with the left elbow. The machine-learned connectivity information 150 defines and describes those geometric kinematic interactions between the keypoints 140. This information is based on knowledge from the human anatomy, where if the wrist is in a particular position, then the elbow should be located relatively close (e.g., not on the other side of the image). In some examples, the machine-learned connectivity information 150 includes distribution of keypoint distances and angles.

In addition, the kinematic structure 128 may include ordering information 148. The ordering information 148 includes information that specifies an order on which set of feature 122 to update next. For example, as indicated above, the sets of features 122 are updated one at a time according to a predefined ordering, which is defined as the ordering information 148. In some examples, the ordering information 148 specifies hips, shoulders, knees, elbows, ankles, wrists, neck and then head, where the right keypoint comes just before its left counterpart.

The kinematic feature updater 124 uses the convolutional blocks 126 to update each set of feature 122 based on the features of one or more neighboring keypoints 140 using the kinematic structure 128. For example, the ordering information 148 may indicate to first evaluate the hips. In this case, the kinematic feature updater 124 uses the convolutional blocks 126 to update a set of features 122 relating to a right hip. The right hip's set of features 122 are updated based on the features of the neighboring keypoints 140 such as the right wrist, the right knee, the left hip, etc. The structure of keypoint connectivity graph 142 indicates which keypoints 140 are neighboring keypoints 140. In some examples, the nodes 144 directed connected to the node 144 representing the right hip's keypoint 140 (via the edges 146) are considered the neighboring keypoints 140. These edges 146 include (or are annotated with) the machine-learned connectivity information 150, which defines the structural and geometric priors between the right hip and the neighboring keypoints 140.

The right hip's features are updated based on the machine-learned connectivity information 150, which may validate that the right hip's set of features 122 relate to the right hip's keypoint 140 or may update the right hip's set of features 122 to correspond to the right hip's keypoint 140 if the right hip's set of features 122 was misclassified as another type of keypoint 140. Then, the ordering information 148 may indicate to evaluate the left hip. The kinematic feature updater 124 obtains the set of features 122 relating to the keypoint 140 of the left hip, and then updates the left's hip's set of features 122 based on the features of neighboring keypoints 140 such as the left wrist, the left knee, the right hip, etc. This process continues according to the pre-defined ordering specified by the ordering information 148.

The heatmap predictor 132 uses one or more convolutional blocks 134 to predict the pose 138 based on the updated sets of features 130. The convolutional blocks 134 receive the updated set of features 130 as an input and generate one or more heatmaps 136. In some examples, the convolutional blocks 134 includes (3, 1, 32)$^4$ and (3, 1, 1)

convolutional blocks. A heatmap 136 predicts the probability of a keypoint 140 occurring at each pixel in the image 102. In some examples, the heatmap 136 generated by the heatmap predictor 132 includes all the keypoints 140 of the pose 138. For example, the heatmap 136 identifies the locations of the first keypoint 140-1 through N keypoint 140-N. In some examples, the heatmap predictor 132 generates a separate heatmap 136 for each keypoint 140 of a pose 138. For example, a first heatmap depicts the location of a first keypoint 140-1, a second heatmap depicts the location of a second keypoint 140-2, a third heatmap depicts the location of a third keypoint 140-3, and so forth.

As shown in FIG. 1E, the pose estimation system 100 may include a convolutional neural network trainer 152 that trains the pose estimation system 100 to obtain CNN parameters 162, which includes the kinematic structure 128. For example, the convolutional neural network trainer 152 may apply training data 154 to the pose estimation system 100, which predicts the heatmaps 136. The convolutional neural network trainer 152 includes a loss calculator 156 that computes a loss 158 based on the heatmaps 136 and the training data 154. In some examples, the loss 158 includes partial mean squared error (MSE) 162. Since the kinematic structure 128 is encoded during training at a coarse resolution, a relatively small receptive field may be large enough to capture and spatially correlate neighboring pose keypoints 140.

Figure 2:
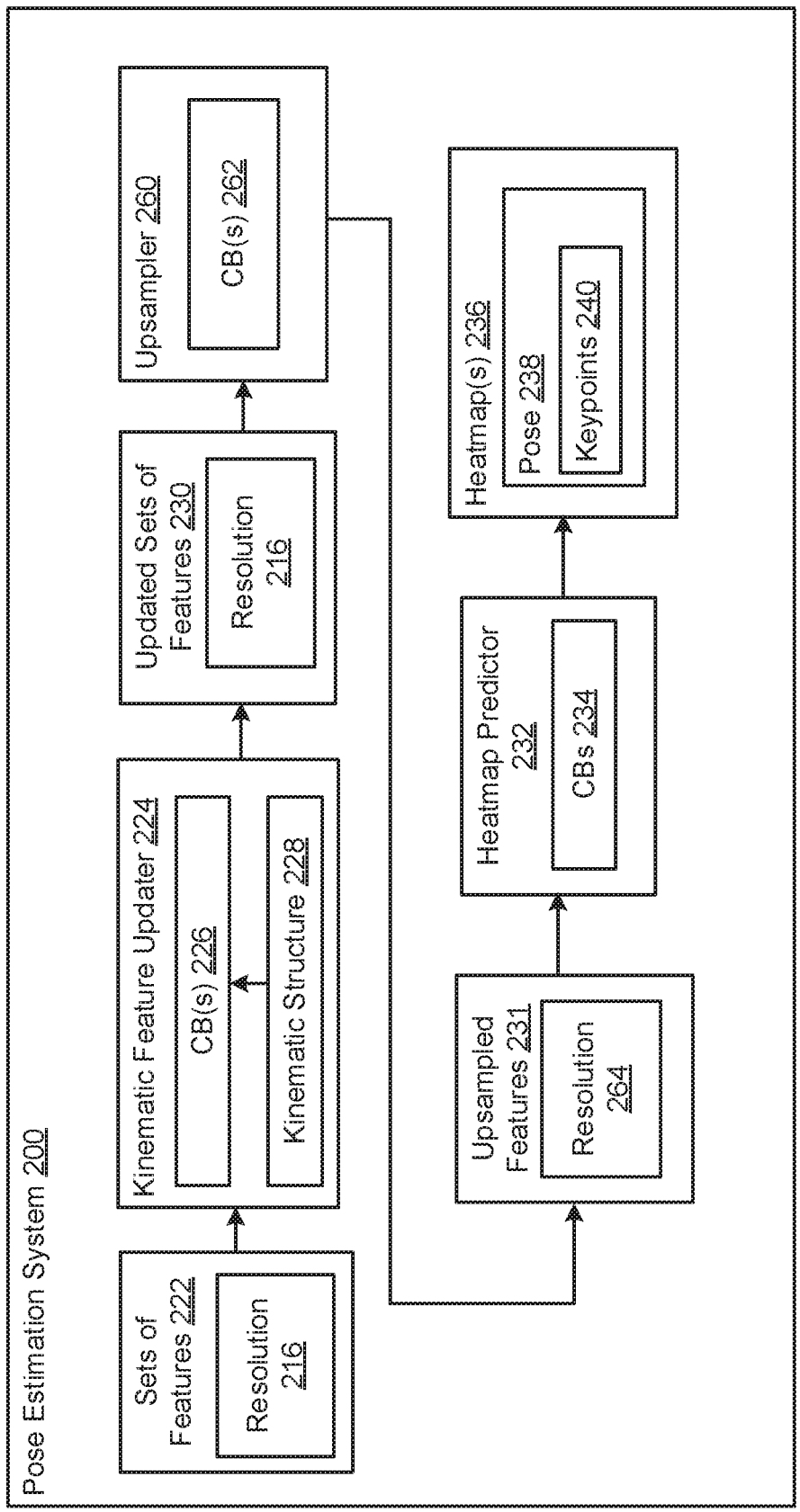
FIG. 2 illustrates a pose estimation system according to another aspect.

FIG. 2 illustrates a pose estimation system 200 according to another aspect. The pose estimation system 200 may be an example of the pose estimation system of FIGS. 1A through 1F and may include any of the details discussed herein. For instance, although not shown in FIG. 2, the pose estimation system 200 may include the feature extractor 104, the downsampler 112, and the feature arranger 118 of FIG. 1A.

The pose estimation system 200 includes a kinematic feature updater 224 that receives sets of features 222 having a resolution 216. Similar to the resolution 116 of FIG. 1A, the resolution 216 may be relatively coarse such as 8×8, 16×16, or 32×32. In some examples, the resolution 216 is 16×16. For example, the kinematic feature updater 224 may receive the sets of features 222 from the feature arranger 118 of FIG. 1A. The kinematic feature updater 224 may be an example of the kinematic feature updater 124 of FIG. 1A and may include any of those details. For example, the kinematic feature updater 224 may use one or more convolutional blocks 226 to update the sets of features 222 based on a kinematic structure 228. For example, the convolutional blocks 226 may update each set of features 222 based on features of one or more neighboring keypoints 240 using the kinematic structure 228. The output of the convolutional blocks 226 is the updated sets of features 230, and the updated sets of features 230 has the resolution 216.

The pose estimation system 200 includes an upsampler 260 that uses one or more convolutional blocks 262 to increase the resolution 216 (at a relatively low level) of the updated sets of features 230 to a resolution 264. The output of the convolutional blocks 262 is upsampled features 231 having a resolution 264 that is higher than the resolution 216, where the upsampled features 231 are used by a heatmap predictor 232 to predict one or more heatmaps 236. In some examples, the resolution 264 is 16×16, 32×32, 64×64, or 128×128. In some examples, the convolutional blocks 262 include a series of convolutional blocks. In some examples, the convolutional blocks 262 include a convolutional block (e.g., 1×1 convolutional) and a series of convolutional blocks (e.g., (3, 1, 64)$^4$). In some examples, the upsampler 260 receives the updated sets of features 230 with the resolution 216, concatenates the updated sets of features 230, and projects the concatenated features back to sixty-four channels using a convolutional block (e.g., 1×1 convolutional block). Then, the projected and concatenated features are upsampled using a series of convolutional blocks (e.g., (3, 1, 64)$^4$) to obtain the upsampled features 231 with the resolution 264.

The heatmap predictor 232 uses a series of convolutional blocks 234 to predict the pose 238 defined by the location of the keypoints 240 based on the upsampled features 231. A heatmap 236 predicts the probability of a keypoint 240 occurring at each pixel in the image data. In some examples, the heatmap 236 generated by the heatmap predictor 232 includes all the keypoints 240 of the pose 238.

Figure 3:
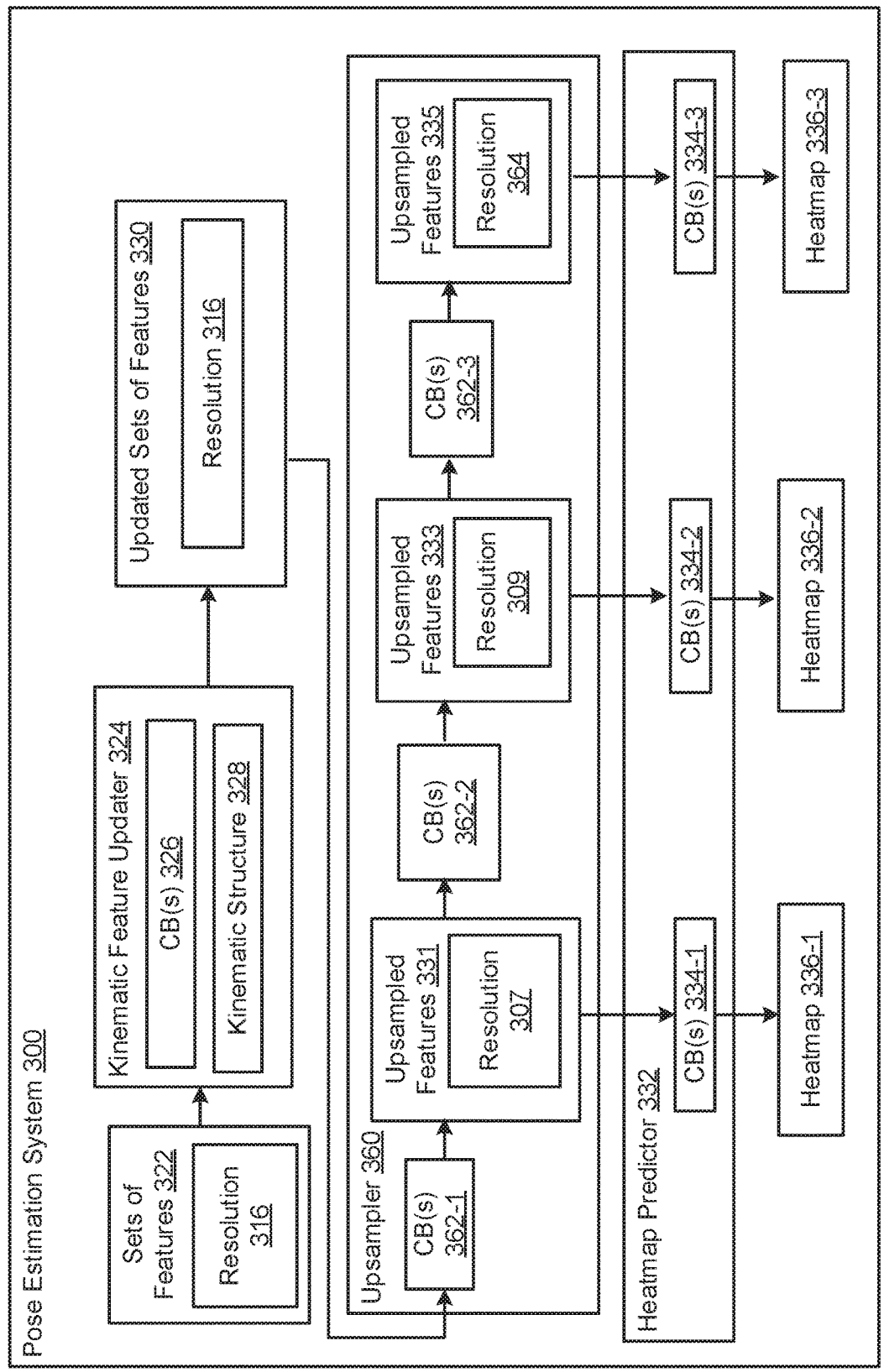
FIG. 3 illustrates a pose estimation system according to another aspect.

FIG. 3 illustrates a pose estimation system 300 according to another aspect. The pose estimation system 300 includes a multi-refinement structure that upsamples the updated sets of features 330 multiple times and generates a separate heatmap (e.g., 336-1, 336-2, 336-3) at each refinement. For example, the pose estimation system 300 may refine the predicted pose hierarchically through a feature pyramid until the finest resolution is reached. The pose estimation system 300 may be an example of the pose estimation system of FIGS. 1A through 1F or the pose estimation system of FIG. 2 and may include any of the details discussed herein. For instance, although not shown in FIG. 3, the pose estimation system 300 may include the feature extractor 104, the downsampler 112, and the feature arranger 118 of FIG. 1A.

The pose estimation system 300 includes a kinematic feature updater 324 that receives sets of features 322 having a resolution 316. The resolution 316 may be relatively coarse such as 8×8, 16×16, or 32×32. In some examples, the resolution 316 is 16×16. For example, the kinematic feature updater 324 may receive the sets of features 322 from the feature arranger 118 of FIG. 1A. The kinematic feature updater 324 may be an example of the kinematic feature updater 124 of FIG. 1A or the kinematic feature updater 224 of FIG. 2 and may include any of those details. For example, the kinematic feature updater 324 may use convolutional blocks 326 to update the sets of features 322 based on a kinematic structure 328. For example, the convolutional blocks 326 may update each set of features 322 based on features of one or more neighboring keypoints 240 using the kinematic structure 328. The output of the convolutional blocks 326 is the updated sets of features 330, and the updated sets of features 330 has the resolution 316.

The pose estimation system 300 includes an upsampler 360 that includes a number of convolutional blocks, which are used to upsample (multiple times) the updated sets of features 330. For example, the upsampler 260 includes a first convolutional block 362-1 that outputs upsampled features 331 with a resolution 307 that is higher than the resolution 316, a second convolutional block 362-2 that outputs upsampled features 333 with a resolution 309 that is higher that the resolution 307, and a third convolutional block 362-3 that outputs upsampled features 333 with a resolution 364 that is higher than the resolution 307. The heatmap predictor 132 includes a first convolutional block 334-1 that generates a first heatmap 336-1 based on the upsampled features 331 with the resolution 307, a second convolutional block 334-2 that generates a second heatmap 336-2 based on the upsampled features 333 with the resolution 309, and a third heatmap 336-3 based on the upsampled features 335 with the resolution 364. In this manner, the pose is predicted in a coarse-to-fine fashion. Also, although FIG. 3 depicts three refinements, the upsampler 360 may define any number of refinements including one, two, or more than three.

In further detail, the upsampler 360 may receive the updated sets of features 330 with the resolution 316 and concatenate the updated sets of features 330. In some examples, the upsampler 360 may also receive the features 108 with the resolution 105 from the downsampler 112 of FIG. 1F. The resolution 105 may be the same resolution as the resolution 307. In some examples, the resolution 105 and the resolution 307 are 32×32. The upsampler 360 may concatenate the features 108 with the resolution 105 with the features 330, and these concatenated features may be projected to sixty-four channels using a convolutional block (e.g., 1×1 convolution block). Then, these concatenated and projected features are used as an input to the first convolutional block 363-1 to obtain the upsampled features 331 with the resolution 307. The first convolutional block 334-1 of the heatmap predictor 332 may receive the upsampled features 331 with the resolution 307 and predict the first heatmap 336-1 based on the upsampled features 331. In some examples, the first heatmap 336-1 depicts the pose of the subject in the manner with the resolution 307.

The second convolutional block 362-2 of the upsampler 360 may receive the upsampled features 331 with the resolution 307 and generate upsampled features 333 with a resolution 309 that is higher than the resolution 307. In some examples, the upsampler 360 (or the second convolutional block 362-2) may also receive the features 108 with the resolution 103 from the downsampler 112 of FIG. 1F. The resolution 103 may be the same resolution as the resolution 309. In some examples, the resolution 103 and the resolution 309 are 64×64. The upsampler 360 may concatenate the features 108 with the resolution 103 with the features 331, and these concatenated features may be projected to sixty-four channels using a convolutional block (e.g., 1×1 convolution block). Then, these concatenated and projected features are used as an input to the second convolutional block 362-2 to obtain the upsampled features 333 with the resolution 309. The second convolutional block 334-2 of the heatmap predictor 332 may receive the upsampled features 333 with the resolution 309 and predict the second heatmap 336-2 based on the upsampled features 333. In some examples, the second heatmap 336-2 depicts the pose of the subject with the resolution 309 (e.g., 64×64).

The third convolutional block 362-3 of the upsampler 360 may receive the upsampled features 333 with the resolution 309 and generate upsampled features 335 with a resolution 364 that is higher than the resolution 309. In some examples, the upsampler 360 (or the convolutional block 362-3) may also receive the features 108 with the resolution 110 from the downsampler 112 of FIG. 1F. The resolution 110 may be the same resolution as the resolution 364. In some examples, the resolution 110 and the resolution 364 are 128×128. The upsampler 360 may concatenate the features 108 with the resolution 110 with the features 333, and these concatenated features may be projected to sixty-four channels using a convolutional block (e.g., 1×1 convolution block). Then, these concatenated and projected features are used as an input to the third convolutional block 362-3 to obtain the upsampled features 335 with the resolution 364. The third convolutional block 334-3 of the heatmap predictor 332 may receive the upsampled features 335 with the resolution 364 and predict the third heatmap 336-3 based on the upsampled features 335. In some examples, the third heatmap 336-3 depicts the pose of the subject with the resolution 364 (e.g., 128×128).

Figure 4B:
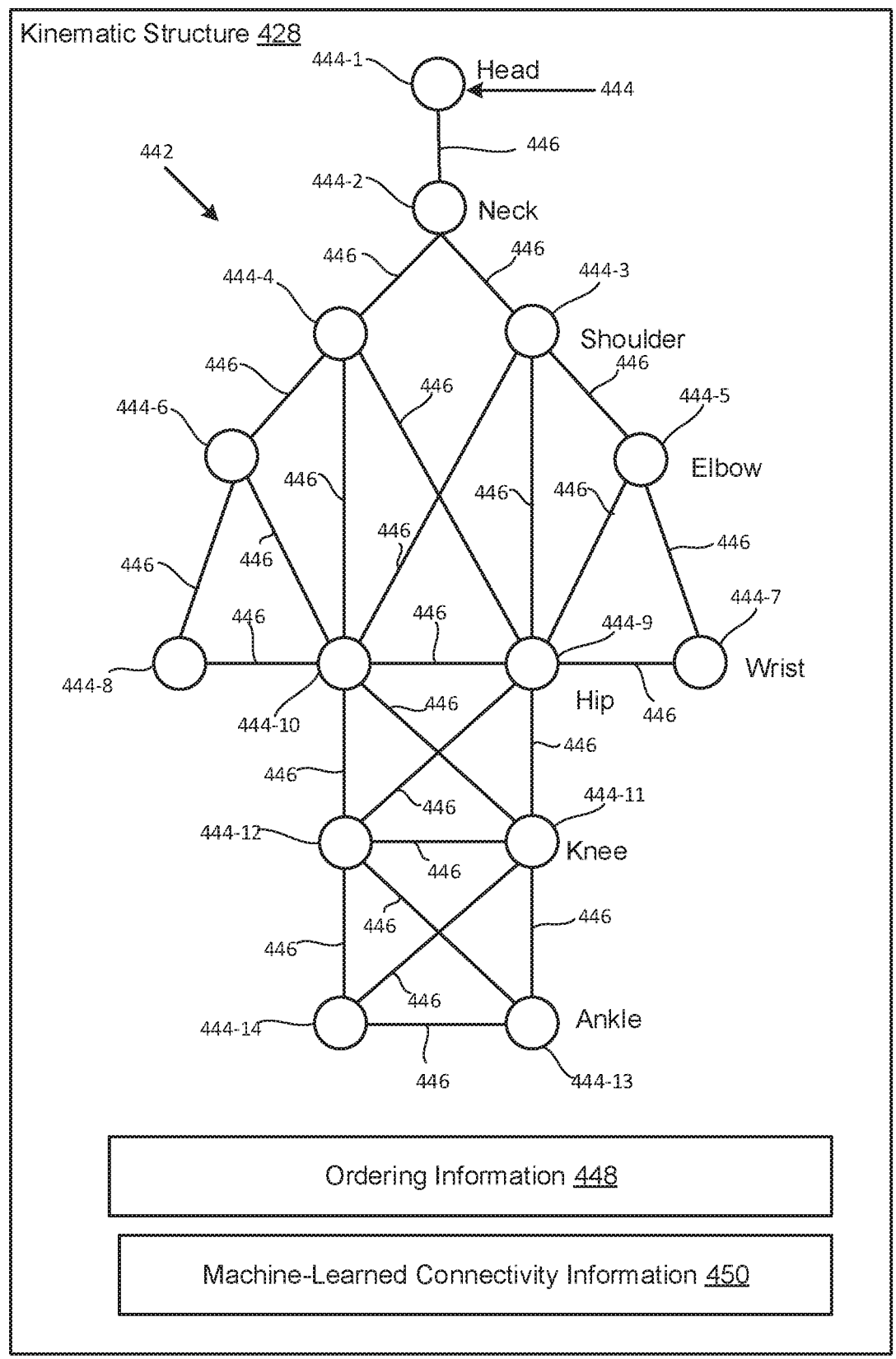
FIG. 4B illustrates an example of a kinematic structure according to an aspect.

FIGS. 4A and 4B illustrates a pose estimation system 400 according to an aspect. The pose estimation system 400 may be an example of the pose estimation system of FIGS. 1A through 1F, the pose estimation system 200 of FIG. 2, and/or the pose estimation system 300 of FIG. 3 and may include any of the details discussed herein. The pose estimation system 400 may employ learned structural and geometric priors at a relatively coarse resolution using one or more CNNs that refine the prediction hierarchically. Generally, the pose estimation system 400 may be considered an efficient and lightweight model that performs human pose estimation from a single image, which uses a fraction of the number of parameters and computation cost as compared with other conventional approaches.

The pose estimation system 400 receives an image 402 and computes heatmaps 436 depicting a pose of a human. The pose is defined by a plurality of keypoints, and the pose estimation system 400 estimates the locations of these keypoints to predict the pose. The pose estimation system 400 generates a separate heatmap 436 for each keypoint 140 of the pose. Although FIG. 4A depicts the heatmaps 436 for the ankle keypoints, the pose estimation system 400 may generate a separate heatmap 436 for each of the keypoints 140 according to a plurality of different resolutions. FIG. 4A depicts heatmaps 436-1 for the left ankle and heatmaps 436-2 for the right ankle. The heatmaps 436-1 depict the location of the left ankle according to different resolutions (e.g., 32×32, 64×64, 128×128), where the top heatmap 436-1 has the highest resolution. The heatmaps 436-2 depict the location of the right ankle according to different resolutions (e.g., 32×32, 64×64, 128×128), where the top heatmap 436-2 has the highest resolution.

In FIG. 4A, the arrows that are annotated with f, d, v and p denote convolutional blocks. A convolutional block may be defined as a two-dimensional (2D) convolution followed by ReLU activation and batch normalization. A series of r convolution blocks are denoted by $(K, S, F)^r$, where K, S, and F are kernel size, stride and the number of output filters, respectively. Also, $(K,S,F)_u$ denotes a convolutional block without batch normalization. The arrows with parameters f, d, v, and p may be used to denote $(3,1,64)^4$, $(5, 2,64)$, $(1, 1,32)$, and $(K,S,F)_u$, convolutional blocks, respectively.

All convolution blocks are unique, e.g., no weight sharing, and their identifying indices are omitted for simplicity. Also, all predicted heatmaps 436 may be resized to 128× 128. As further described below, after applying the kinematic features updates in operation 424, the pose estimation system 400 was able to correctly recover the ankles while reducing the number of trainable parameters and reducing the amount of computing resources (e.g., FLOPS) required to implement the techniques.

The image 402 may be denoted by I, where I denotes an n×n image. A human pose is represented by K 2D keypoints, e.g. head, left ankle, etc., where $p_k^i = (x_k^i, y_k^i) \in \mathbb{R}_{\geq 0}^2$ is the $k^{th}$ keypoint of example i in the dataset. The pose estimation system 400 predicts a set of K heatmaps, one for each keypoint. The ground truth heatmap $H_k^i \in \mathbb{R}_{\geq 0}^{n \times n}$ nor keypoint $p_k^i$ is an unnormalized Gaussian centered at $p_k^i$ with standard deviation σ.

An image 402 is inputted to the convolutional blocks 406 (e.g., $(3,1,64)^4$), and the convolutional blocks 406 extract features 408-1 from the image 402. In some examples, the features 408-1 are referred to as a feature map (or feature matrix) with the dimensions of 128×128×64, where 128× 128 refers to the resolution, and 64 refers to the number of color channels (or output filters).

The convolutional block 414-1 (e.g., (5, 2,64)) downsamples the extracted features 408-1. For example, the convolutional block 414-1 receives the features 408-1 and outputs features 408-2 having a lower resolution. In some examples, the features 408-2 are referred to as a feature map (or feature matrix) with the dimensions of 64×64×64. The convolutional block 414-2 (e.g., (5, 2,64)) downsamples the features 408-2. For example, the convolutional block 414-2 receives the features 408-2 and outputs features 408-3 having a lower resolution. In some examples, the features 408-3 are referred to as a feature map (or feature matrix) with the dimensions of 32×32×64. The convolutional block 414-3 (e.g., (5, 2,64)) downsamples the extracted features 408-3. For example, the convolutional block 414-3 receives the features 408-3 and outputs features 408-4 having a lower resolution. In some examples, the features 408-4 are referred to as a feature map (or feature matrix) with the dimensions of 16×16×64.

At the coarsest resolution (e.g., 16×16), the features 408-4 are decoupled into k independent sets of features 422 using a convolution block 420 (e.g., (1, 1,32)). The sets of features 422 may be referred to as pre-updated k sets of features. The sets of features 422 may include a first set of features, a second set of features, and a third set through N sets of features, where each set of features corresponds to a different keypoint. In some examples, to encourage that each set of features 422 corresponds to a unique keypoint, the pose estimation system 400 may predict a single heatmap from each set of features 422 out of the k sets, and then concatenate all predicted k heatmaps to form pre-updated heatmaps. FIG. 4A illustrates predicted pre-updated heatmaps 441 for the left and right ankles. The pose estimation system 400 may include another set of convolutional blocks (e.g., $(3,1,32)^4$ and $(3,1,1)_u$) to predict the pre-updated heatmaps.

In operation 424, the pose estimation system 400 applies kinematic feature updates to the k independent sets of features 422 using a kinematic structure 428 (shown in FIG. 4B) to obtain updated k sets of features 430. For example, the pose estimation system 400 updates, using a series of convolutional blocks, the sets of features 422 according to a predefined ordering and kinematic connectivity defined by the kinematic structure 428. In some examples, the convolutional blocks used to apply the kinematic feature updates include (1, 1, 32) and $(3, 1, 32)^4$ convolutional blocks.

The convolutional blocks at operation 424 update the sets of features 422 in a way that enables the pose estimation system 400 to learn kinematic priors between keypoints and how to correlate the keypoints. For example, the convolutional blocks may receive the K sets of features 422, which can be represented by $\{f_k\}_1^K$. The sets of features 422 are updated one at a time according to a predefined ordering, as further discussed below.

The kinematic structure 428 is a model that defines the kinematic connectivity between keypoints. In some examples, the keypoints includes head, neck, right shoulder, left shoulder, right elbow, left elbow, right hip, left hip, right wrist, left wrist, right knee, left knee, right ankle, and left ankle. Referring to FIG. 4B, the kinematic structure 428 includes a keypoint connectivity graph 442. In some examples, the keypoint connectivity graph 442 is an undirected graph. The keypoint connectivity graph 442 includes nodes 444 and edges 446. Each node 444 represents a separate keypoint. Each edge 446 may represent machine-learned connectivity information 450 between two keypoints. The nodes 444 includes a node 444-1 representing a head, a node 444-2 representing a neck, a node 444-3 representing a right shoulder, a node 444-4 representing a left shoulder, a node 444-5 representing a right elbow, a node 444-6 representing a left elbow, a node 444-7 representing a right wrist, a node 444-8 representing a left wrist, a node 444-9 representing a right hip, a node 444-10 representing a left hip, a node 444-11 representing a right knee, a node 444-12 representing a left knee, a node 444-13 representing a right ankle, and a node 444-14 representing a left ankle.

The machine-learned connectivity information 450 may include structural and geometric information (also referred to as structural and geometric priors) between the keypoints. In some examples, the machine-learned connectivity information 450 includes distribution of keypoint distances and angles. The kinematic structure 428 may include ordering information 448. The ordering information 448 includes information that specifies an order on which set of features 422 to update next. For example, as indicated above, the sets of features 412 are updated one at a time according to a predefined ordering, which is defined as the ordering information 448. In some examples, the ordering information 448 starts with keypoints that are more likely to be predicted with high fidelity, e.g., hips or head, and ends with typically poorly predicted ones, e.g., wrists or ankles.

In some examples, the ordering information 448 specifies hips, shoulders, knees, elbows, ankles, wrists, neck and then head, where the right keypoint comes just before its left counterpart. For example, the ordering information 448 may indicate the following order: node 444-9, node 444-10, node 444-3, node 444-4, node 444-11, node 444-12, node 444-5, node 444-6, node 444-7, node 444-8, node 444-2, and then node 444-1. However, the embodiments may encompass any type of keypoint ordering.

The convolutional blocks at operation 424 update each set of features 422 based on the features of one or more neighboring keypoints using the kinematic structure 428. For example, the ordering information 448 may indicate to first evaluate the hips. In this case, the set of features from the k independent sets 422 that relate to a right hip are updated. The right hip's set of features 422 are updated based on the features of the neighboring keypoints such as the right wrist, the right knee, the left hip, etc. The structure of keypoint connectivity graph 442 indicates which keypoints are neighboring keypoints. In some examples, the nodes 444 (e.g., node 444-3, node 444-5, node 444-7, node 444-11, node 444-10, node 444-4) directed connected to the node 444-9 (via the edges 146) are considered the neighboring keypoints.

These edges 446 include (or are annotated with) the machine-learned connectivity information 450, which defines the structural and geomatic priors between the right hip and the neighboring keypoints. The right hip's features are updated based on the machine-learned connectivity information 450, which may validate that the right hip's set of features 422 relate to the right hip's keypoint or may update the right hip's set of features 422 to correspond to the right hip's keypoint if the right hip's set of features 422 was misclassified as another type of keypoint. Then, the ordering information 148 may indicate to evaluate the left hip next. The same process continues to update the left hip's set of features 422, and the pose estimation system 400 selects another set of features 422 to evaluate as specified by the ordering information 448. This process continues until all the sets of features 422 are updated.

The machine-learned connectivity information 450 defines which keypoints the pose estimation system 400 is expected to learn to correlate. As indicated above, the pose estimation system 400 uses an undirected graph to define such connectivity, were each keypoint is represented by a unique node 444, and edges 446 (ε) encodes the desired connectivity. For a respective node 444, Eq. (1) defines the ordered set of its neighboring keypoints with respect to E:

$$\mathcal{N}(k) = (u | \forall (k,u) \in \varepsilon) \qquad \text{Eq. (1):}$$

The convolutional blocks update the keypoints one at a time following the predefined ordering. The features $f_k$ of keypoint k are updated as follows:

$$c_k \leftarrow [f_k, f_j | \forall j \in \mathcal{N}(k)] \qquad \text{Eq. (2):}$$

$$f \leftarrow f_k + \lambda_k g_k(h_k(c_k)) \qquad \text{Eq. (3):}$$

$\lambda_k$ is a trainable parameter, and $h_k$ and $g_k$ are $(1,1,32)$ and $(3,1,32)^4$, respectively, which are the convolutional blocks at operation 424. In Eq. (2), the pose estimation system 400 concatenates $f_k$ and all the features of its neighboring keypoints. Then, $h_k$ projects the concatenated features to 32 channels, which then pass through four convolutional blocks. The features are updated via a residual connection in Eq. (3) with a trainable weight. Finally, inspired by message passing techniques, the pose estimation system 400 updates the features one more time with respect to the reversed ordering. It is noted that the two passes do not share any trainable parameters.

The result of operation 424 is updated sets of features 430, which are referred to as post-updated k sets of features. In some examples, the pose estimation system 400 uses the updated sets of features 430 to compute post-updated heatmaps. In some examples, the pose estimation system 400 may predict a single heatmap from each updated set of features 430 out of the k sets, and then concatenate all predicted k heatmaps to form post-updated heatmaps. FIG. 4A illustrates predicted post-updated heatmaps 443 for the left and right ankles. The pose estimation system 400 may include another set of convolutional blocks (e.g., $(3,1,32)^4$ and $(3,1,1)_u$) to predict the post-updated heatmaps.

At this point, in operation 451, the pose estimation system 400 concatenates all the features used to predict the post-updated heatmaps 443. For example, at operation 451, the pose estimation system 400 concatenates the updated sets of features 430. Then, the pose estimation system 400 initiates a multi-refinement operation to generate heatmaps 436 according to different levels of resolution. For example, the concatenated features are then bilinearly upsampled and concatenated with the skip connection and projected back to 64 channels. At each resolution, K heatmaps 436 are predicted, which are then bilinearly upsampled to full resolution. The refinement procedure continues until full resolution is achieved. Finally, loss is applied to all predicted heatmaps.

In further detail, at operation 453-1, the pose estimation system 400 concatenates the features 408-3 with the concatenated features from operation 451 and then projects these features back to 64 channels. Then, the convolutional blocks 462-1 (e.g., $(3,1,64)^4$) and the convolutional block 471-1 (e.g., $(K, S, F)_u$) upsample the concatenated features to predict upsampled features 431 at an increased resolution (e.g., 32×32). The upsampled features 431 are used to predict heatmaps 436 at the increased resolution (e.g., 32×32).

At operation 453-2, the pose estimation system 400 concatenates the features 408-2 with the features from convolutional block 462-1 and then projects these features back to 64 channels. Then, the convolutional blocks 462-2 (e.g., $(3,1,64)^4$) and the convolutional block 471-2 (e.g., $(K, S, F)_u$) upsample the concatenated features to predict upsampled features 433 at an increased resolution (e.g., 64×64). The upsampled features 433 are used to predict heatmaps 436 at the increased resolution (e.g., 64×64).

At operation 453-3, the pose estimation system 400 concatenates the features 408-1 with the features from convolutional block 462-2 and then projects these features back to 64 channels. Then, the convolutional blocks 462-3 (e.g., $(3,1,64)^4$) upsample the concatenated features to predict upsampled features 435 at an increased resolution (e.g., 128×128). The upsampled features 435 are used to predict heatmaps 436 at the increased resolution (e.g., 128×128).

In some examples, the pose estimation system 400 may be trained based on loss in terms of partial mean squared error (MSE), which is shown in Eq. (4).

$$L = \frac{1}{M}\sum_{m=1}^{M}\frac{1}{|a_i|}\sum_{k=1}^{K}1_{a_i}(k)\frac{\|H_k^i - O_k^i\|_2^2}{n^2} \qquad \text{Eq. (4)}$$

M is the batch size and $O_k^i$ is the heatmap 436 predicted by the pose estimation system 100. Some of the images in the datasets are not fully annotated, as such, $a_i$ is defined to be a set of annotated keypoints of example i. It should be noted that MSE is a fairly standard loss for pose estimation but its partial counterpart has not been used before. The loss computed by the pose estimation system 400 is the sum of Eq. (4) for all the predicted heatmaps 436.

Figure 5:
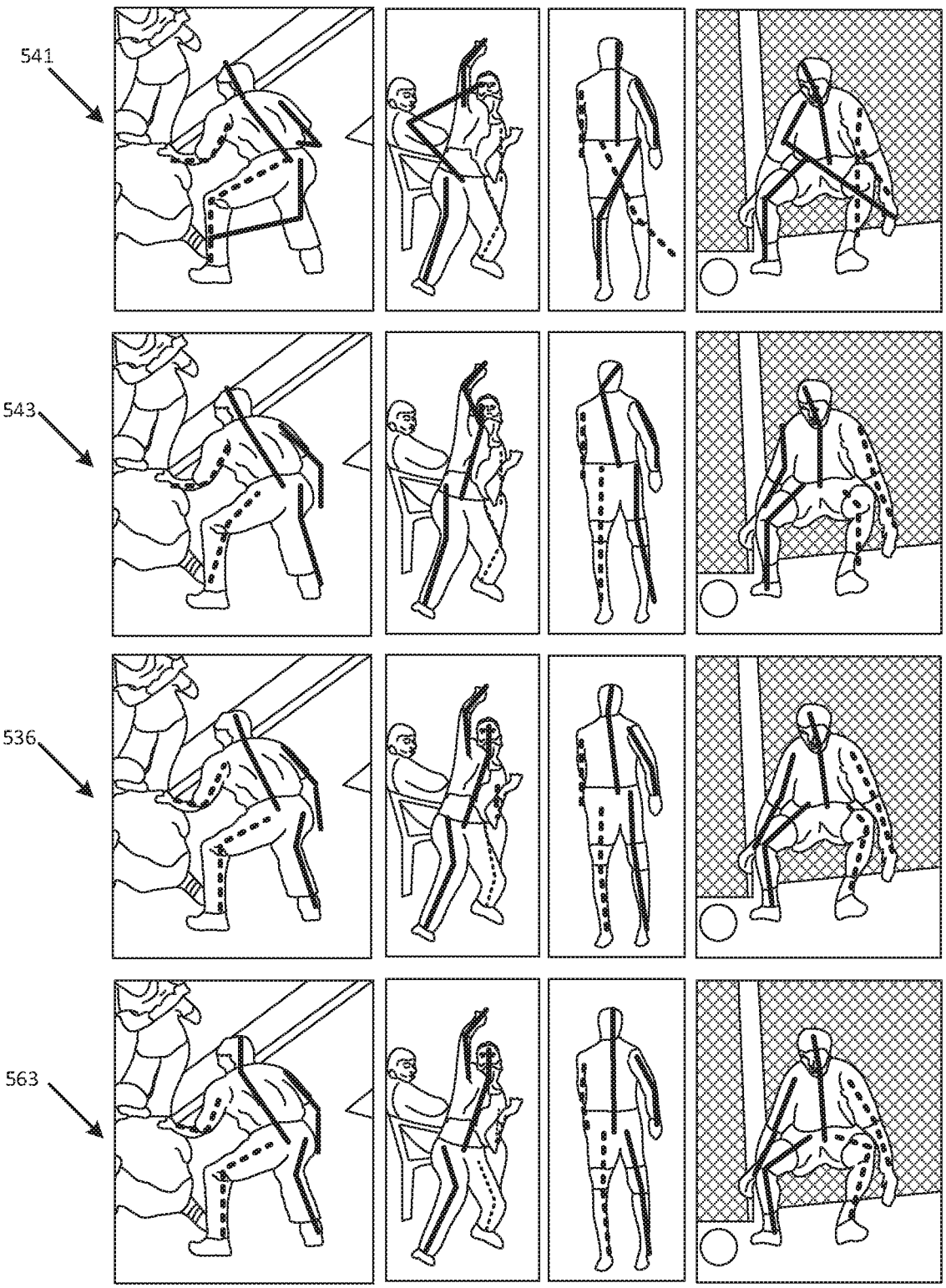
FIG. 5 illustrates a plurality of heatmaps generated by the pose estimation system according to an aspect.

FIG. 5 illustrates a plurality of heatmaps generated by the pose estimation system 400 of FIG. 4. For example, the heatmaps include pre-updated heatmaps 541 that were generated based on the pre-updated set of features at a coarse resolution (e.g., 16×16). The pre-updated heatmaps 541 are examples of the pre-updated heatmaps 441 of FIG. 4A. The heatmaps include post-updated heatmaps 543 that were generated based on the post-updated sets of features at a coarse resolution (e.g., 16×16). The post-updated heatmaps 543 are examples of the post-updated heatmaps 443 of FIG. 4A. The heatmaps include heatmaps 536, which represent the final heatmaps at the finest resolution (e.g., 128×128). The heatmaps include ground truth heatmaps 563.

Figure 6:
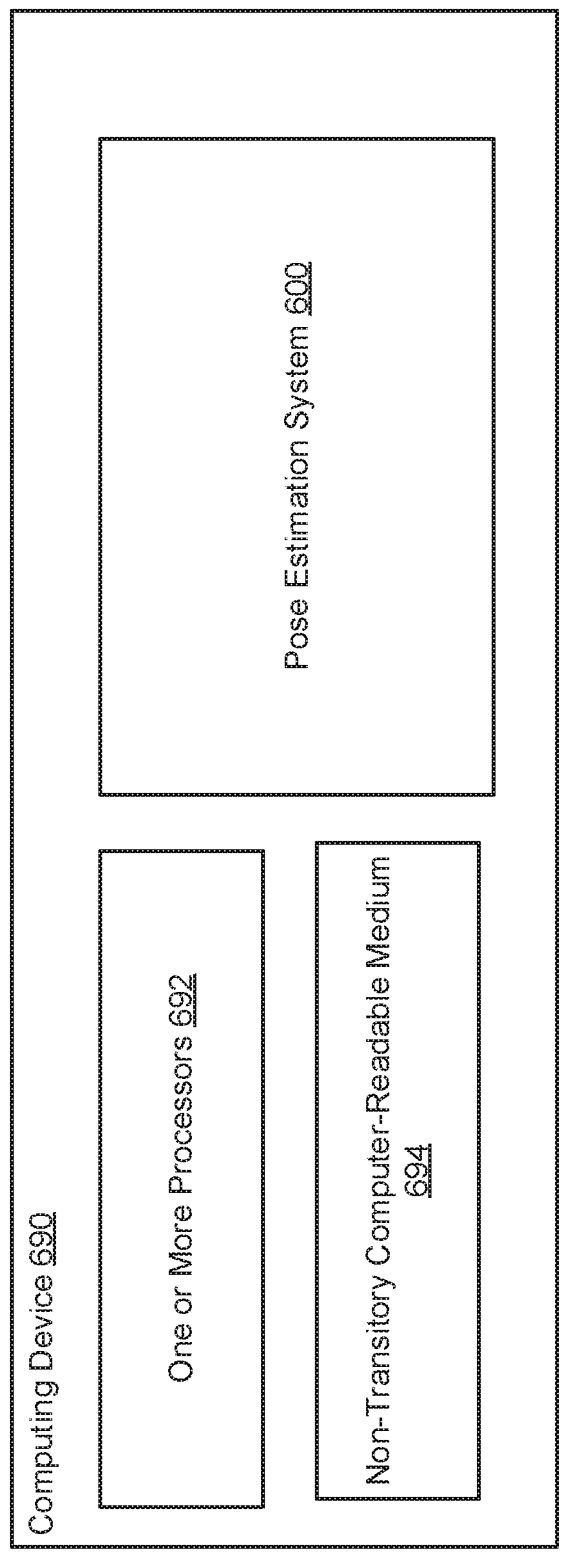
FIG. 6 illustrates an example of a computing device having a pose estimation system according to an aspect.

FIG. 6 illustrates a computing device 690 having one or more processors 692 and a non-transitory computer-readable medium 694 storing executable instructions that when executed by the processors 692 are configured to execute a pose estimation system 600. The pose estimation system 600 may be any of the pose estimation systems described with reference to the previous figures including the pose estimation system 100 of FIGS. 1A through 1F, the pose estimation system 200 of FIG. 2, the pose estimation system 300 of FIG. 3, and/or the pose estimation system 400 of FIGS. 4A and 4B. In some examples, the computing device 690 is a mobile computing device having constrained computing resources such as a mobile phone, a laptop, or a tablet. Because the pose estimation system 600 is relatively light (e.g., a reduced amount of trainable parameters and a reduced amount of computing resources), the pose estimation system 600 may operate on a relatively small device (in terms of computing power or memory) while providing relatively accurate pose estimation.

Figure 7:
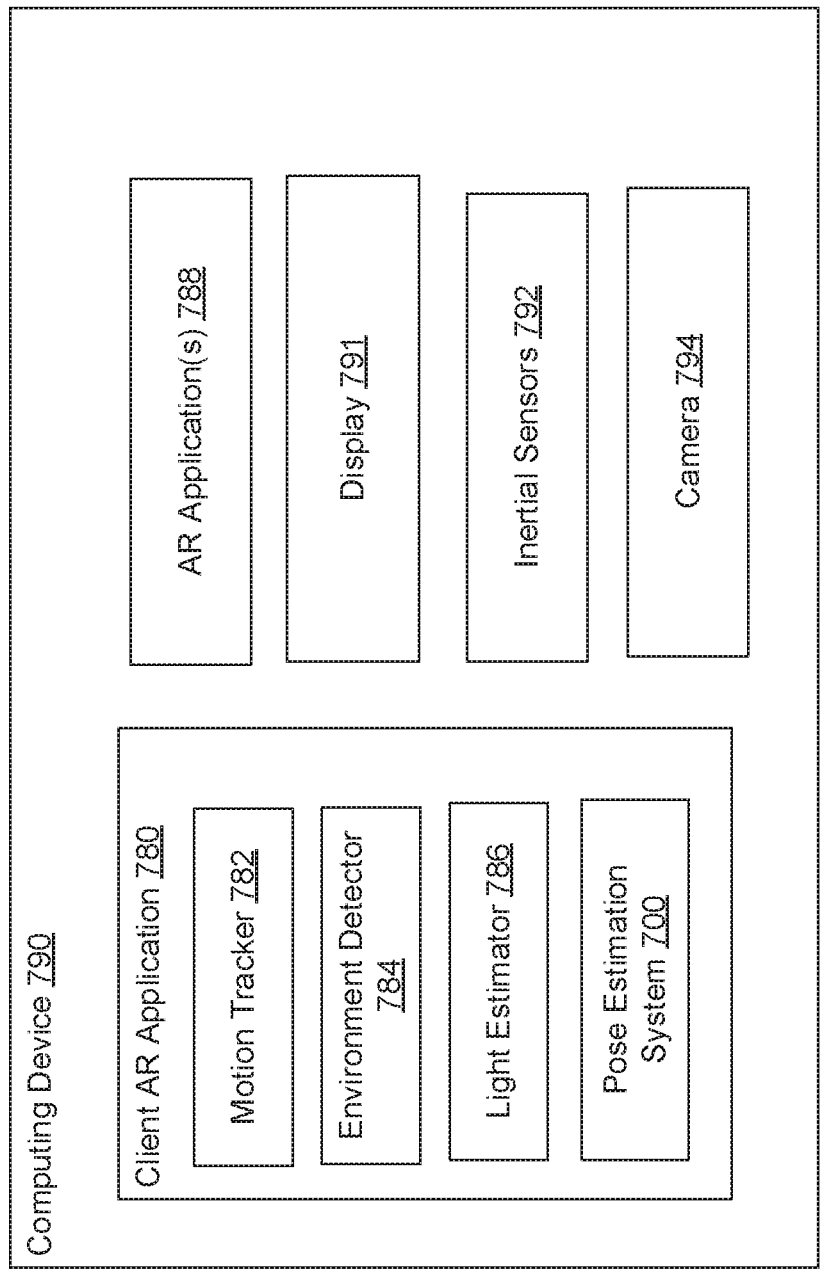
FIG. 7 illustrates an example of a computing device having a pose estimation system according to another aspect.

FIG. 7 illustrates an example of a computing device 790 configured to execute a client augmented reality (AR) application 780. The client AR application 780 may communicate with an AR service executing on one or more AR servers. In some examples, the client AR application 780 is a software development kit (SDK) that operates in conjunction with one or more AR applications 788. The AR applications 788 may be any type of AR applications (e.g., gaming, entertainment, medicine, education, etc.) executable on the computing device 790.

The client AR application 780 includes a motion tracker 782 configured to permit the computing device 790 to detect and track its position relative to the physical space, an environment detector 784 configured to permit the computing device 790 to detect the size and location of different types of surfaces (e.g., horizontal, vertical, angled), and a light estimator 786 to permit the computing device 790 to estimate the environment's current lighting conditions. The computing device 790 includes a display 791, one or more inertial sensors 792, and a camera 794.

The client AR application 780 may include a pose estimation system 700. The pose estimation system 700 may be any of the pose estimation systems described with reference to the previous figures such as the pose estimation system 100 of FIGS. 1A through 1F, the pose estimation system 200 of FIG. 2, the pose estimation system 300 of FIG. 3, and/or the pose estimation system 400 of FIGS. 4A and 4B. The camera 794 may capture image data having a human. The pose estimation system 700 may predict the pose of the human in the image data and send the predicted pose to the AR server. The AR server may use those poses for online or offline processing of the captured images to add visual effects or improve the human tracking.

In some examples, using the motion tracker 782, the environment detector 784, and the light estimator 786, the client AR application 780 is configured to generate a set of visual feature points to be sent and stored on the AR server for future AR localization. The user may use the camera 794 on the computing device 790 to capture a scene from the physical space (e.g. moving the camera around to capture a specific area), and the client AR application 780 is configured to detect the set of visual feature points and track the movement of the set of visual feature points over time. For example, with a combination of the movement of the set of visual feature points and readings from the inertial sensors 792 on the computing device 790, the client AR application 780 is configured to determine the position and orientation of the computing device 790 as the computing device 790 moves through the physical space. In some examples, the client AR application 780 may use the pose estimation system 700 to detect a pose of a human contained in the image data, and then send the detected pose coordinates (e.g., pose vector defining the x,y coordinates of the keypoints) in conjunction with the set of visual feature points. In some examples, the detected pose coordinates form part of the set of visual feature points.

In some examples, the set of visual feature points are a plurality of points (e.g., interesting points) that represent the user's environment. In some examples, each of the visual feature points includes an approximation of a fixed location and orientation in the physical space, and the set of visual feature points may be updated over time. In some examples, the set of visual feature points may be referred to as an anchor or a set of persistent visual features that represent physical objects in the physical world. For example, the set of visual feature points may be used to localize the AR environment for a secondary user or localize the AR environment for the computing device 790 in a subsequent session For example, the visual feature points may be used to compare and match against other visual feature points captured by a secondary computing device in order to determine whether the physical space is the same as the physical space of the stored visual feature points and to calculate the location of the secondary computing device within the AR environment in relation to the stored visual feature points. In some examples, AR content is attached to the one of more of the visual feature points. The AR content may include objects (e.g., 3D objects), annotations, or other information. For example, the user of the computing device 790 can place a napping kitten on the corner of a coffee table or annotate a painting with biographical information about the artist. Motion tracking means that you can move around and view these objects from any angle, and even if you turn around and leave the room, when you come back, the kitten or annotation will be right where you left it.

Figure 8:
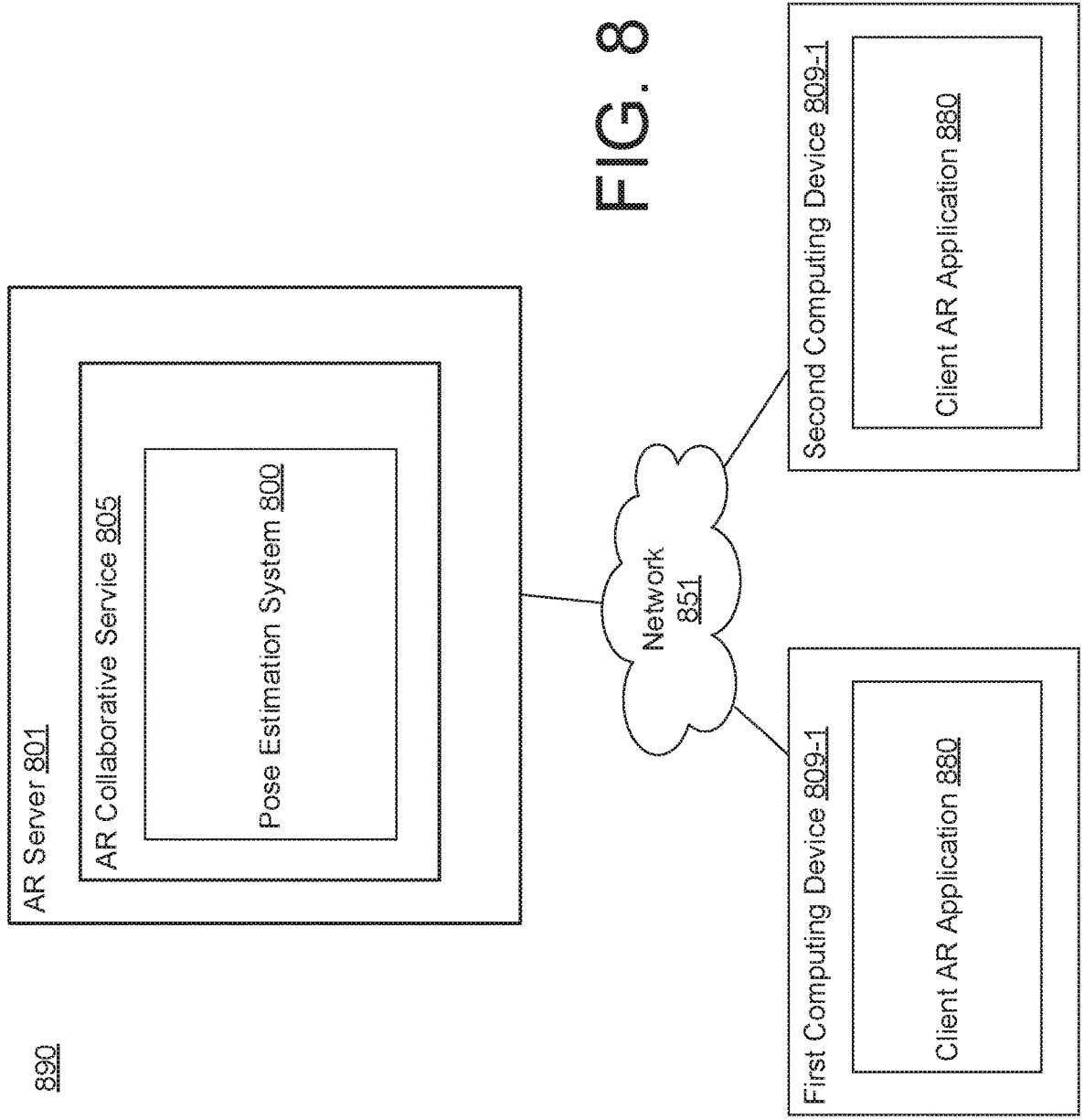
FIG. 8 illustrates an argument reality (AR) system that includes a pose estimation system according to an aspect.

FIG. 8 illustrates an AR system 890 that includes an AR collaborative service 805, executable by one or more AR servers 801, configured to communicate, over a network 851, with a plurality of computing devices including a first computing device 809-1 and a second computing device 809-2. In some examples, a user of the first computing device 809-1 and a user of the second computing device 809-1 may share the same AR environment. Each of the first computing device 809-1 and the second computing device 809-1 is configured to execute a client AR application 880. The client AR application 880 is configured to communicate with the AR collaborative service 805 via one or more application programming interfaces (APIs). The first computing device 809-1 and the second computing device 809-2 may be examples of the computing device 790 and may include any of the details discussed herein.

However, instead of a pose estimation system 800 executing on a client device (like the embodiment of FIG. 7), the pose estimation system 800 executes on the AR server 801. The pose estimation system 800 may be any of the pose estimation systems described with reference to the previous figures such as the pose estimation system 100 of FIGS. 1A through 1F, the pose estimation system 200 of FIG. 2, the pose estimation system 300 of FIG. 3, and/or the pose estimation system 400 of FIGS. 4A and 4B. The first computing device 809-1 (or the second computing device 809-2) may capture image data. The client AR application 880 may transmit digital information representing the image via the network 851 to the AR collaborative service 805. The pose estimation system 800 may obtain the image data (e.g., a single image) and predict a pose of a human in accordance with the techniques discussed herein.

Figure 9:
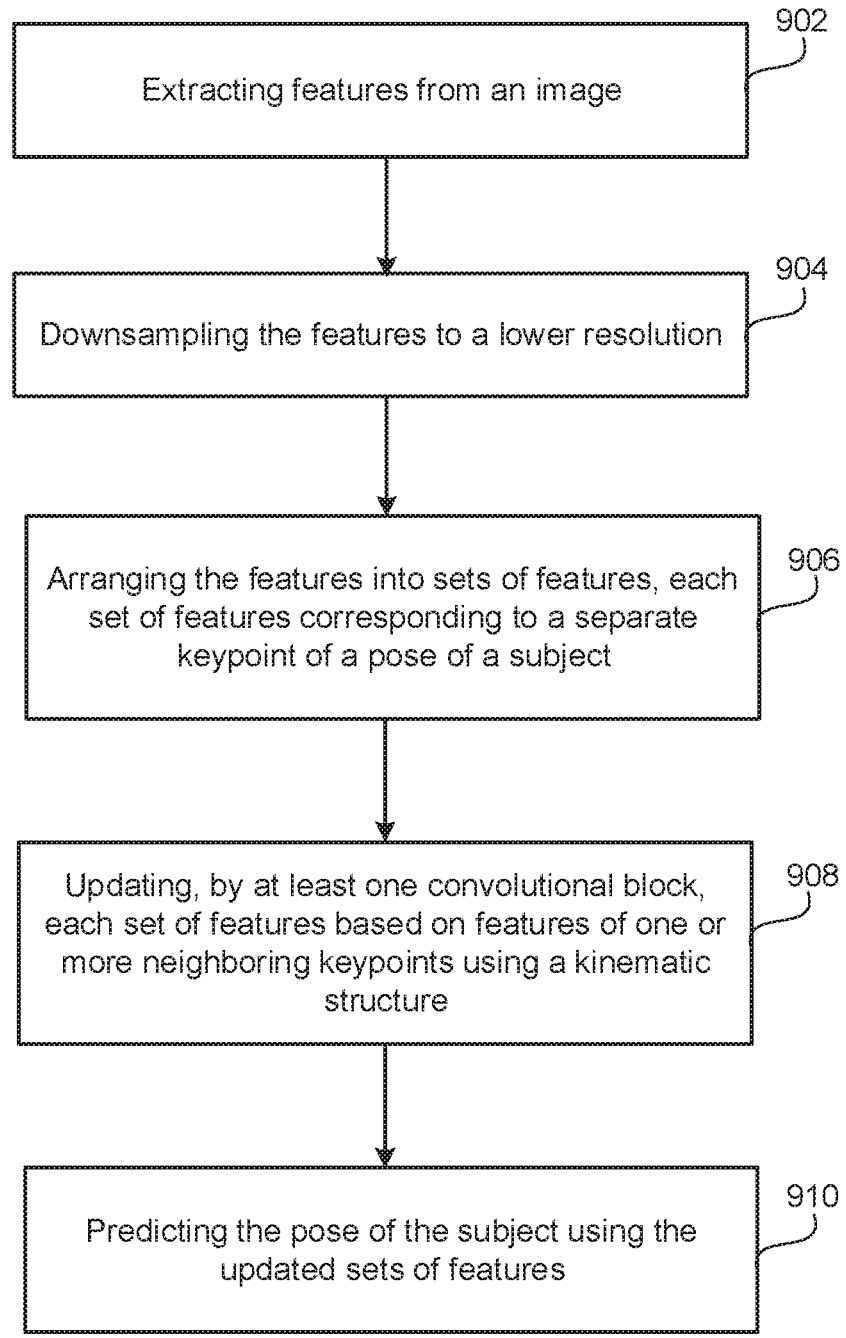
FIG. 9 illustrates a flowchart depicting example operations of a pose estimation system according to an aspect.

FIG. 9 illustrates a flowchart 900 depicting example operations of pose estimation system 100 according to an aspect. Although the flowchart 900 is described with reference to the pose estimation system 100 of FIGS. 1A through 1F, the flowchart 900 may be applicable to any of the pose estimation systems described herein.

Operation 902 includes extracting features 108 (e.g., appearance encoding) from an image 102. Operation 904 includes downsampling a resolution the features 108 (e.g., downsampling the appearance encoding to a lower resolution). Operation 906 includes arranging the features 108 into sets of features 122, where each set of features 122 corresponds to a separate keypoint 140 of a pose 138 of a subject. Operation 908 includes updating, by at least one convolutional block, each set of features 122 based on features of one or more neighboring keypoints 140 using a kinematic structure 128. Operation 910 includes predicting the pose 138 of the subject using the updated sets of features 130.

Figure 10:
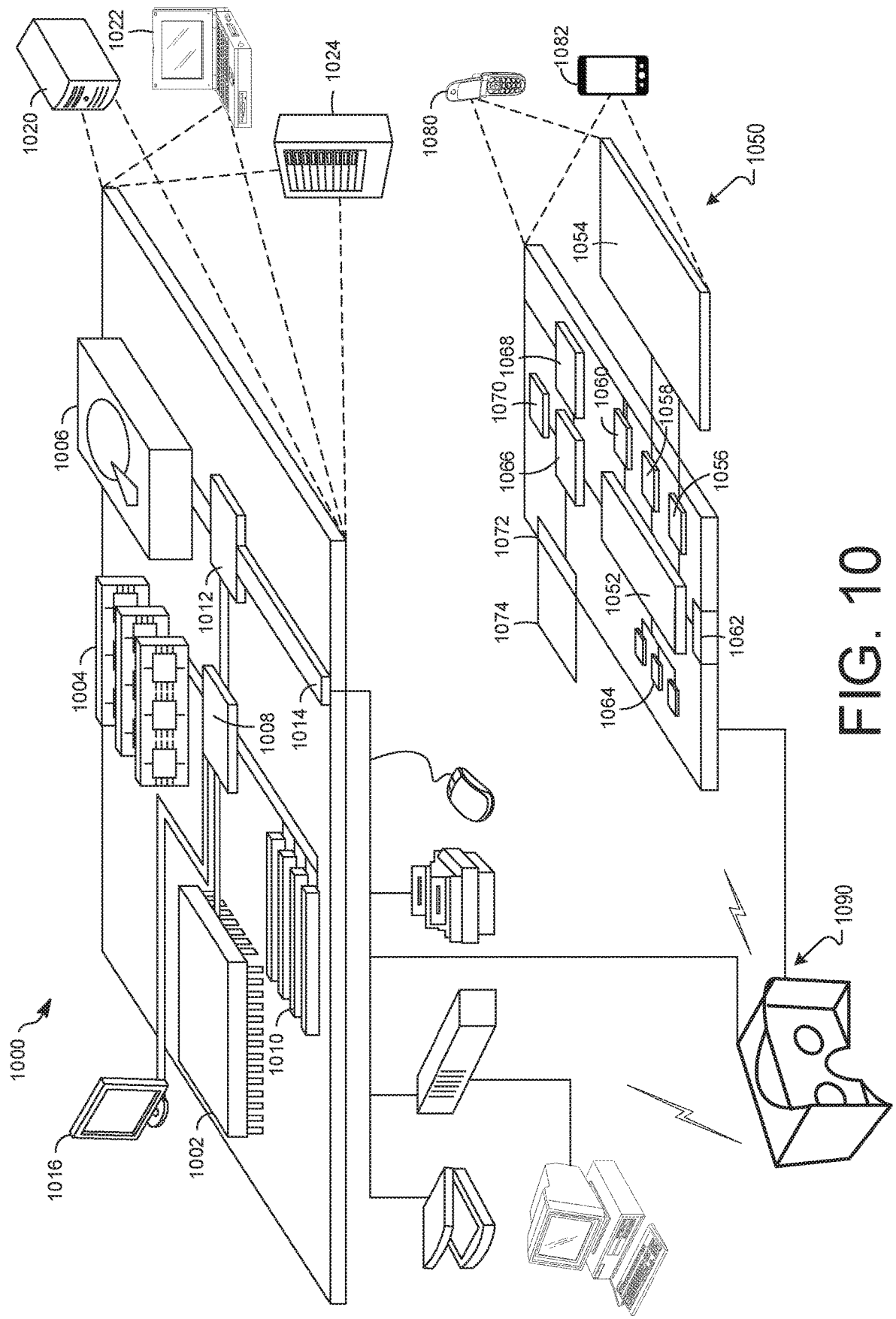
FIG. 10 illustrates example computing devices of a pose estimation system according to an aspect.

FIG. 10 shows an example of an example computer device 1000 and an example mobile computer device 1050, which may be used with the techniques described here. For example, the computer device 1000 and/or the mobile computer device 1050 may implement any of the pose estimation systems discussed herein including the pose estimation system 100, the pose estimation system 200, the pose estimation system 300, and/or the pose estimation system 400. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. In addition, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing devices 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050 or may also store applications or other information for device 1050. Specifically, expansion memory 1074 may include instructions to carry out or supplement the processes described above and may include secure information also. Thus, for example, expansion memory 1074 may be provided as a security module for device 1050 and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion using a laser pointer.

In some implementations, one or more input devices included on, or connected to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1090.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for pose estimation using a convolutional neural network, the method comprising:
    extracting features from an image;
    downsampling the features to a lower resolution;
    arranging the features into sets of features, each set of features corresponding to a separate keypoint of a pose of a subject;
    updating, by at least one convolutional block, each set of features based on features of one or more neighboring keypoints using a kinematic structure;
    upsampling the updated sets of features, multiple times, to generate first upsampled features and second upsampled features; and
    predicting the pose of the subject using the first and second upsampled features.

2. The method of claim 1, wherein the kinematic structure includes a plurality of nodes corresponding to a plurality of keypoints, and a plurality of edges representing connections between the nodes, the plurality of edges being annotated with at least one of structural or geometric information about a structure of a human body that have been pre-learned during a neural network training phase.

3. The method of claim 1, wherein the sets of features are updated one set at a time, wherein the kinematic structure includes ordering information that specifies an updating order that predefines which set of features to update next.

4. The method of claim 1, wherein the downsampling includes downsampling the features multiple times using a series of convolutional blocks.

5. The method of claim 1, wherein the sets of features includes a first set of features corresponding to a first keypoint, a second set of features corresponding to a second keypoint, and a third set of features corresponding to a third keypoint, wherein the updating includes updating, by a series of convolutional blocks, the first set of features based on the second and third sets of features in response to the second and third sets being identified as neighboring keypoints by the kinematic structure.

6. The method of claim 1, wherein the upsampling includes:
    upsampling, by one or more first convolutional blocks, to increase the resolution of the updated sets of features to obtain the first upsampled features;
    upsampling, by one or more second convolutional blocks, to increase the resolution of the first upsampled features to obtain the second upsampled features; and
    upsampling, by one or more third convolutional blocks, to increase the resolution of the second upsampled features to obtain third upsampled features,
    wherein one or more first heatmaps are generated based on the first upsampled features, one or more second heatmaps are generated based on the second upsampled features, and one or more third heatmaps are generated based on the third upsampled features.

7. The method of claim 1, wherein the predicting the pose includes generating a separate heatmap for each keypoint of the pose.

8. A non-transitory computer-readable medium storing executable instructions that when executed by at least one processor are configured to cause the at least one processor to execute operations, the operations comprising:
    extract features from an image;
    downsample the features to a lower resolution;
    arrange the features into sets of features, each set of features corresponding to a separate keypoint of a pose of a subject;
    update, by at least one convolutional block, each set of features based on features of one or more neighboring keypoints using a kinematic structure, the kinematic structure including at least one of structural or geometric information about a structure of a human body that have been pre-learned during a neural network training phase; and predict the pose of the subject using the updated sets of features.

9. The non-transitory computer-readable medium of claim 8, wherein the sets of features are updated one set at a time, wherein the kinematic structure includes ordering information that specifies an updating order defining which set of features to update next, the updating order indicating to update a set of features relating to a shoulder before updating a set of features relating to a wrist.

10. The non-transitory computer-readable medium of claim 8, wherein the sets of features includes a first set of features corresponding to a right shoulder, a second set of features corresponding to a left shoulder, and a third set of features corresponding to a right elbow, wherein the first set of features are updated by a series of convolutional blocks based on the second and third sets of features in response to the second and third sets being identified as neighboring keypoints by the kinematic structure.

11. The non-transitory computer-readable medium of claim 8, wherein the updated sets of features are upsampled multiple times such that each upsample operation generates a separate set of upsampled features each having a different resolution, wherein heatmaps with different resolutions are generated based on the separate sets of upsampled features.

12. A computing device for predicting human poses, the computing device comprising:
   at least one processor; and
   a non-transitory computer-readable medium storing executable instructions that when executed by at least one processor are configured to execute a pose estimation system,
   the pose estimation system configured to:
      extract features from an image;
      downsample the features to a lower resolution;
      arrange the features into sets of features, each set of features corresponding to a separate keypoint of a pose of a subject;
      update, by at least one convolutional block, each set of features based on features of one or more neighboring keypoints using a kinematic structure, the kinematic structure including at least one of structural or geometric information about a structure of a human body that have been pre-learned during a neural network training phase;
      upsampling the updated sets of features, multiple times, to generate first upsampled features and second upsampled features; and
      predict the pose of the subject using the first and second upsampled features.

13. The computing device of claim 12, wherein the computing device is a server computing device.

14. The computing device of claim 12, wherein the computing device is a mobile computing device.

15. The computing device of claim 14, wherein the mobile computing device includes a client augment reality (AR) application configured to execute on an operating system of the mobile computing device, the client AR application including the pose estimation system.

16. The computing device of claim 12, wherein the kinematic structure includes a plurality of nodes corresponding to the keypoints, and a plurality of edges representing connections between the nodes, the plurality of edges being annotated with the structural or geometric information about the structure of the human body.

17. The computing device of claim 12, wherein the sets of features are updated one set at a time using a series of convolutional blocks, wherein the kinematic structure includes ordering information that specifies an updating order that defines which set of features to update next.

* * * * *